US012280315B2

(12) United States Patent
Benedetto et al.

(10) Patent No.: US 12,280,315 B2
(45) Date of Patent: Apr. 22, 2025

(54) BUILDING A DYNAMIC SOCIAL COMMUNITY BASED ON SIMILAR INTERACTION REGIONS OF GAME PLAYS OF A GAMING APPLICATION

(71) Applicant: Sony Interactive Entertainment LLC, San Mateo, CA (US)

(72) Inventors: Warren Benedetto, Foothill Ranch, CA (US); Landon Noss, San Jose, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 228 days.

(21) Appl. No.: 17/889,191

(22) Filed: Aug. 16, 2022

(65) Prior Publication Data

US 2022/0395756 A1    Dec. 15, 2022

Related U.S. Application Data

(62) Division of application No. 16/285,062, filed on Feb. 25, 2019, now Pat. No. 11,413,547.

(51) Int. Cl.
*A63F 13/00*    (2014.01)
*A63F 13/79*    (2014.01)
(Continued)

(52) U.S. Cl.
CPC ............ *A63F 13/87* (2014.09); *A63F 13/79* (2014.09); *A63F 13/795* (2014.09); *A63F 2300/5566* (2013.01)

(58) Field of Classification Search
CPC .................................. A63F 13/79; A63F 13/87
See application file for complete search history.

(56) References Cited

U.S. PATENT DOCUMENTS

2001/0009867 A1 *    7/2001    Sakaguchi .............. A63F 13/35
                                                            463/42
2005/0245317 A1 *    11/2005    Arthur .................... A63F 13/12
                                                            463/42
(Continued)

OTHER PUBLICATIONS

"Borderlands: The Pre-Sequel", archive Jan. 1, 2018, https://www.co-optimus.com/ <https://web.archive.org/web/20180101140253/https://www.co-optimus.com/article/12374/borderlands-the-pre-sequelco-op-faq.html> (Year: 2018) (Year: 2018).*

(Continued)

*Primary Examiner* — Justin L Myhr
(74) *Attorney, Agent, or Firm* — Kilpatrick Townsend & Stockton LLP

(57) ABSTRACT

A method for gaming including receiving game states of game plays of players playing a gaming application. The method includes tracking game play progression for each of the game plays based on game states, wherein game play progression is defined by a corresponding set of relationship characteristics. A first game play of a first player is associated with a first set of relationship characteristics. The method includes identifying for the first player players having corresponding game plays that include one or more relationship characteristics from the first set of relationship characteristics. The method includes surfacing the identified players for display to the first player. Each surfaced players have a corresponding game play progression that is related to the first game play progression. Each surfaced players is associated with a corresponding communication warning indicator that provides relative game play progression between game plays the corresponding surfaced player and the first player.

15 Claims, 19 Drawing Sheets

(51) Int. Cl.
*A63F 13/795* (2014.01)
*A63F 13/87* (2014.01)

(56) References Cited

U.S. PATENT DOCUMENTS

| | | | | |
|---|---|---|---|---|
| 2007/0173321 | A1* | 7/2007 | Shen | A63F 13/537 |
| | | | | 463/40 |
| 2009/0163274 | A1* | 6/2009 | Kando | A63F 13/577 |
| | | | | 463/31 |
| 2012/0004026 | A1* | 1/2012 | Vann | G06Q 30/02 |
| | | | | 463/25 |
| 2014/0228108 | A1* | 8/2014 | Bruno, Jr. | G06F 9/5077 |
| | | | | 463/29 |
| 2014/0274368 | A1* | 9/2014 | Cotter | A63F 13/86 |
| | | | | 463/31 |
| 2016/0151711 | A1* | 6/2016 | Arai | A63F 13/55 |
| | | | | 463/31 |
| 2017/0266565 | A1* | 9/2017 | Choudhuri | A63F 13/44 |
| 2017/0296930 | A1* | 10/2017 | Hall | A63F 13/87 |

OTHER PUBLICATIONS

CN Application No. 202080024247.0, Office Action dated Jan. 29, 2024, 10 pages.

* cited by examiner

BUILDING A DYNAMIC SOCIAL COMMUNITY BASED ON SIMILAR INTERACTION REGIONS OF GAME PLAYS OF A GAMING APPLICATION

CLAIM OF PRIORITY

The present application is a divisional of and claims priority to and the benefit of commonly owned, patent application, U.S. Ser. No. 16/285,062, filed on Feb. 25, 2019, entitled "BUILDING A DYNAMIC SOCIAL COMMUNITY BASED ON REAL-TIME IN-GAME CONTEXT OF A PLAYER," which is herein incorporated by reference in its entirety for all purposes.

TECHNICAL FIELD

The present disclosure is related to video gaming and social networking, and more specifically to building a social community for a player playing a gaming application based on in-game progression and location of the game play, wherein the social community includes players playing the same game at the same in-game progression or location.

BACKGROUND OF THE DISCLOSURE

With higher processing power of computing systems, video games are becoming more complex and expansive. For example, open world video games allow a player to move throughout a gaming environment without any predetermined pattern. That is, the player is able to freely explore the gaming environment without following any ordered approach. In addition, forums may be established that allow players of a video game to obtain information. These forums may provide step-by-step instructions on how to complete a task or how to reach the next level. These forums provide an important social connection to players of a video game, such as by allowing players who share the same interest in a particular video game to interact with each other.

However, a player joining a forum takes the risk that sensitive and unwanted information may be revealed without any warning. The sensitive information may take away from the enjoyment of playing the video game. For example, sensitive information may include spoilers that tell how the video game ends, or may include spoilers that reveal plot twists, etc. After learning about such information, a player may be so affected that the video game may not be that interesting anymore, and very quickly the player may quit playing that video game—even without finishing.

Participants to a forum may not even know that they are divulging sensitive information. For instance, a participant that is asking a question within the forum may unwittingly reveal to other players an upcoming obstacle or boss at the end of certain part of the game. In another instance, a player that is offering information may take great care to not divulge sensitive information by prefacing communication with a warning that potentially sensitive information may soon be revealed. In each of these cases, whether the participant is seeking or giving information, extensive measures need to be taken in order not to ruin a video game for certain participants within the forum. Alas, even with all these measured precautions, participants may still learn about the sensitive information. As a result, some players may choose to avoid all forums for fear of learning about sensitive information, even when they really want to join a forum to learn just enough information about their game play (e.g., how to accomplish a difficult task, etc.), or even to just casually interact with others who also enjoy playing the video game—like talking about the video game over a beer at a bar.

It is in this context that embodiments of the disclosure arise.

SUMMARY

Embodiments of the present disclosure relate to systems and methods for building instant social connections and emergent communities based on in-game progression and location of a particular player. That player can participate in a real-time mobile social experience by connecting to other players playing the same game who are at a similar point in the video game (either physically or progression-wise). This helps mitigate the risk of spoilers, since all the players are basically in the same part of the game, and know approximately the same information. That is, players in a particular emergent community probably do not know any sensitive information that would ruin the game for others in that emergent community. In that manner, these players can be connected to and communicate with each other without actively being careful to not reveal sensitive information.

In one embodiment, a method for gaming is disclosed. The method includes receiving a plurality of game states for a plurality of game plays of a plurality of players playing a gaming application. The method includes tracking game play progression for each of the plurality of game plays based on the plurality of game states, wherein game play progression is defined by a corresponding set of relationship characteristics, wherein a first game play of a first player is associated with a first set of relationship characteristics. The method includes identifying for the first player one or more players having corresponding game plays that each include one or more relationship characteristics from the first set of relationship characteristics for the first player. The method includes surfacing the one or more identified players for display to the first player. Each of the surfaced players have a corresponding game play progression that is related to the first game play progression of the first player. Each of the surfaced players is associated with a corresponding communication warning indicator that provides relative game play progression between game plays of the corresponding surfaced player and the first player.

In one embodiment, a method for gaming is disclosed. The method includes receiving a plurality of game states for a plurality of game plays of a plurality of players playing a gaming application. The method includes tracking quantified game activity (QGA) progression for each of the plurality of game plays based on the plurality of game states. The method includes at a first point in time, determining a first QGA progression for a first game play of a first player playing the gaming application. The method includes determining a social community of players at the first point in time, wherein a corresponding player in the social community of players has a corresponding QGA progression that shares one or more achieved QGAs with a first set of achieved QGAs of the first QGA progression. The method includes for the corresponding player in the social community of players, providing a corresponding progress warning indicator showing relative progress of QGA progressions of the corresponding player and the first player. The method includes generating a graphical user interface (GUI) including a list of the players in the social community of players with corresponding progress warning indicators for selection to enable communication between the first player and one or more players in the social community.

In another embodiment, another method for gaming is disclosed. The method includes receiving a plurality of game states for a plurality of game plays of a plurality of players playing a gaming application. The method includes tracking a plurality of interaction regions in a gaming world associated with the plurality of game plays, wherein each game play is currently engaging with a corresponding interaction region. The method includes determining a first interaction region in a gaming world associated with a first game play of a first player playing the gaming application. The method includes filtering the plurality of players to build a social community of players, wherein players in the social community of players have corresponding interaction regions in the gaming world that are within a predefined offset from the first interaction region associated with a first game play of a first player. The method includes connecting the first player to at least one player in the social community of players to enable communication between connected players.

In another embodiment, a non-transitory computer-readable medium storing a computer program for gaming is disclosed. The computer-readable medium includes program instructions for receiving a plurality of game states for a plurality of game plays of a plurality of players playing a gaming application. The computer-readable medium includes program instructions for tracking quantified game activity (QGA) progression for each of the plurality of game plays based on the plurality of game states. The computer-readable medium includes program instructions for determining at a first point in time a first QGA progression for a first game play of a first player playing the gaming application. The computer-readable medium includes program instructions for determining a social community of players at the first point in time, wherein a corresponding player in the social community of players has a corresponding QGA progression that shares one or more achieved QGAs with a first set of achieved QGAs of the first QGA progression. The computer-readable medium includes program instructions for providing for the corresponding player in the social community of players a corresponding progress warning indicator showing relative progress of QGA progressions of the corresponding player and the first player. The computer-readable medium includes program instructions for generating a graphical user interface (GUI) including a list of the players in the social community of players with corresponding progress warning indicators for selection to enable communication between the first player and one or more players in the social community.

In still another embodiment, a computer system is disclosed, wherein the computer system includes a processor and memory coupled to the processor and having stored therein instructions that, if executed by the computer system, cause the computer system to execute a method for gaming The method as executed by the computer system includes receiving a plurality of game states for a plurality of game plays of a plurality of players playing a gaming application. The method includes tracking quantified game activity (QGA) progression for each of the plurality of game plays based on the plurality of game states. The method includes at a first point in time, determining a first QGA progression for a first game play of a first player playing the gaming application. The method includes determining a social community of players at the first point in time, wherein a corresponding player in the social community of players has a corresponding QGA progression that shares one or more achieved QGAs with a first set of achieved QGAs of the first QGA progression. The method includes for the corresponding player in the social community of players, providing a corresponding progress warning indicator showing relative progress of QGA progressions of the corresponding player and the first player. The method includes generating a graphical user interface (GUI) including a list of the players in the social community of players with corresponding progress warning indicators for selection to enable communication between the first player and one or more players in the social community.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods for building social connections through emergent social communities based on in-game activities, location, metadata, and other attributes, including but not limited to in-game progression, map location in a gaming environment associated with a particular player playing a gaming application, character attributes, etc., in accordance with one embodiment of the present disclosure. For example, social connections between players can be established between players that have characters of the same race, same class, same configuration, similar character loadouts, similar game play experiences (e.g., players who have beaten a certain type of enemy in their past respective game plays), etc. The player from which the social connections are made can be connected with other players in the emergent social community, such as to socially communicate about each of their game plays for the gaming application. Because the players are generally at the same progression through the gaming application and/or at the same map location in a gaming environment of the gaming application, the connected players can communicate freely without having to worry excessively about revealing sensitive information about the gaming application that another player probably does not want to hear. In particular, each of the players probably know the same amount and type of information about the gaming application, and as such probably do not know any information that could be sensitive to any of the players in that community. In addition, because the players are at the same progression through the gaming application and/or at the same map location in a gaming environment of the gaming application, the players have a similar overall game context. In that manner, each player does not need to come up to speed to understand the context within which a particular question is asked, and as such is able to readily answer that question, for example even if the quest is about some obscure object or enemy.

With the above general understanding of the various embodiments, example details of the embodiments will now be described with reference to the various drawings.

Figure 1A:
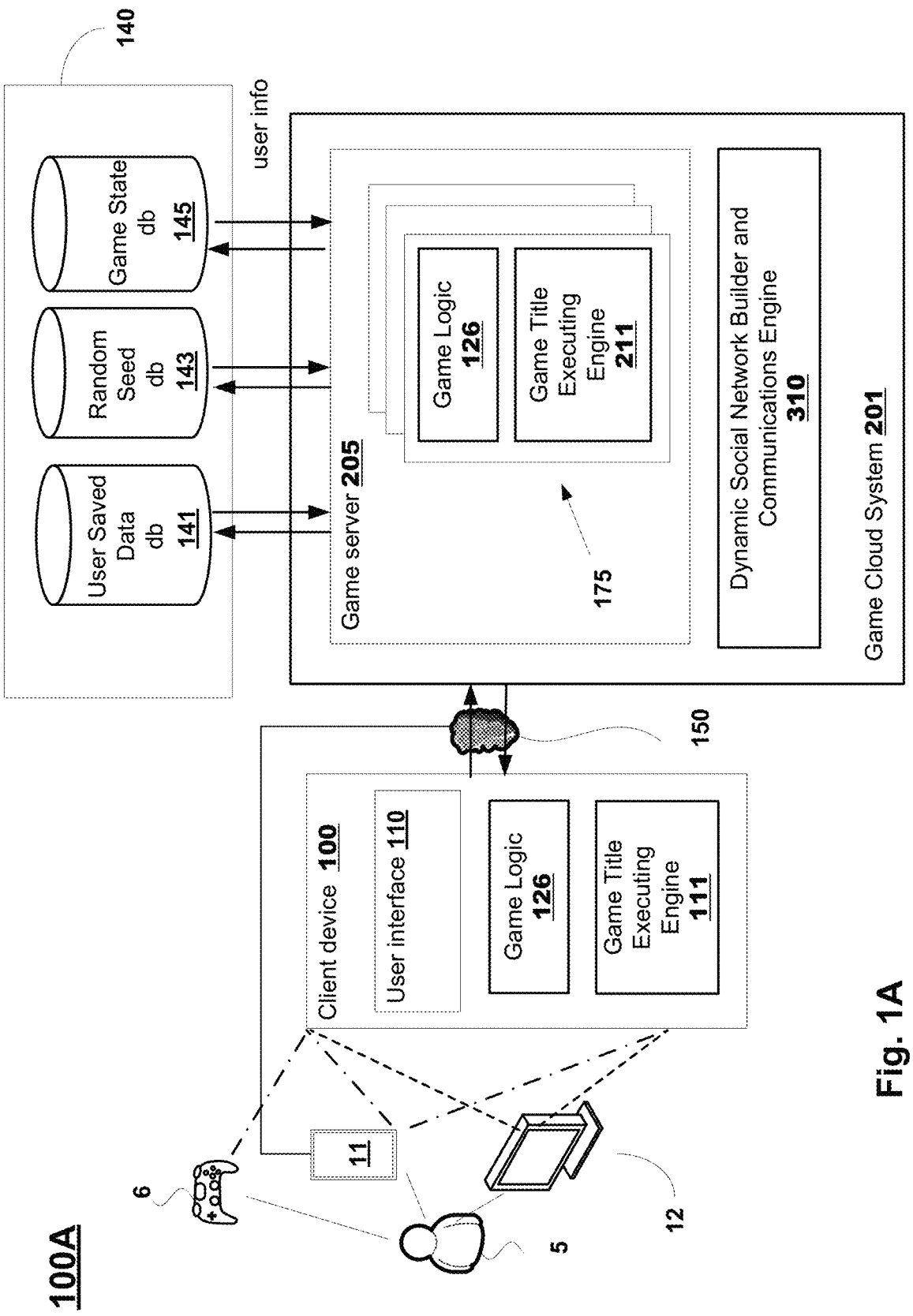
FIG. 1A illustrates a system providing gaming to a player through a local device or through a cloud game network, wherein the system dynamically builds social connections through emergent social communities based on in-game progression and/or map location in a gaming environment associated with a particular player playing a gaming application, in accordance with one embodiment of the present disclosure.

FIG. 1A illustrates a system 100A providing gaming to a player through a local device or through a cloud game network, wherein the system dynamically builds social connections through emergent social communities based on in-game progression and/or map location in a gaming environment associated with a particular player playing a gaming application, in accordance with one embodiment of the present disclosure. The player to which the emergent social community is built can be connected to other players within the emergent community over channels that facilitate social interaction around the gaming application without being overly mindful of revealing too much sensitive information about the gaming application to other players, and can join a community that is in tune with the game play of that player. As such, everyone in the social community is on the "same page" regarding an overall game context. For example, that player does not have to provide too much background information to the other players in the community before jumping into a discussion that all can participate in fully.

As shown in FIG. 1A, the gaming application may be executing locally at a client device 100 (e.g., through game title executing engine 111 and game logic 126) of the player 5, or may be executing at a back-end game title executing engine (e.g., game engine) 211 operating at a back-end game server 205 of a cloud game network or game cloud system (GCS) 201. In either case, the GCS 201 is configured to provide a dynamic social network builder and communications engine 310 that is configured to build social connections through emergent social communities based on in-game progression and/or map location in a gaming environment associated with a particular player playing a gaming application, and to connect that player to other players within the emergent social community for purposes of social interaction around the gaming application. Further, the gaming application may be executing in a single-player mode, or multi-player mode.

In particular, client device 100 may include a game title executing engine 111 (also referred to as game engine) configured for local execution of the gaming application. Game logic 126 of the gaming application runs on top of and/or in association with the game title executing engine 111. For example, the game logic 126 (of the gaming application) that is executing makes function calls down to the game title executing engine 111, such as for physics information, for texture information, etc. More specifically, game title executing engine 111 performs basic processor-based functions for executing the gaming application (e.g., through game logic 126) and services associated with the gaming application. For example, processor-based functions include 2D or 3D rendering, physics simulation, scripting, audio, animation, graphics processing, lighting, shading, rasterization, ray tracking, shadowing, culling, transformation, etc. In addition, services for the gaming application include streaming, encoding, memory management, multi-thread management, quality of service (QoS), bandwidth testing, social networking, management of social friends, communication with friends, establishing and managing communication channels, texting, instant messaging, chat support, etc.

In another embodiment, the gaming application may be executing at a back-end game title executing engine 211 (also referred to as game engine) operating at a back-end game server 205 of GCS 201. Game title executing engine 211 performs similarly as game title executing engine 111, previously described. More particularly, the game title executing engine 211 may be operating within one of many physical and/or virtual game processors of game server 205. Game logic 126 may be executing on top of and/or in association with game title executing engine 211, similar to how game logic 126 executes on top of and/or in association with game title executing engine 111. For example, game logic 126 that is executing makes function calls down to the game title executing engine 211, such as for physics information, for texture information, etc. Game title executing engine 211 and the game logic 126 combined form an instance 175 of the gaming application, as will be further described below. Game server 205 is configured to manage and control a plurality of instances executing one or more gaming applications for one or more players.

The client device 100 may receive input from various types of input devices, such as game controllers 6, tablet computers 11, keyboards, and gestures captured by video cameras, mice, touch pads, etc. Client device 100 can be any type of computing device having at least a memory and a processor module that is capable of connecting to the game server 205 over network 150. Some examples of client device 100 include a personal computer (PC), a game console, a home theater device, a general purpose computer, mobile computing device, a tablet, a phone, or any other types of computing devices that can interact with the game server 205 to execute an instance of a gaming application.

Client device 100 is configured for receiving rendered images, and for displaying the rendered images on display 12. For example, through local game processing, the rendered images may be delivered by the local game executing engine 111, in response to input commands that are used to drive game play of player 5. As another example, through cloud based services the rendered images may be delivered by an instance 175 of a gaming application executing on game executing engine 211 of game server 205 in response to input commands that are used to drive game play of player 5. That is, through remote game processing, the rendered images may be delivered by the remote game title executing engine 211. In either case, client device 100 is configured to interact with the executing engine 211 or 111 in association with the game play of player 5, such as through input commands that are used to drive game play.

Also, client device 100 is configured to interact with the game server 205 to capture and store metadata and/or information of the game play of player 5 when playing a gaming application. The metadata includes information (e.g., game state, etc.) related to the game play. For example, the metadata may include location based information corresponding to a location of a character within a gaming world of the game play of the player 5. In one embodiment, the metadata could include snapshot information that is related to a point in the gaming application at which the snapshot was captured. Relevant information may be stored in one or more databases of database 140.

In one embodiment, the metadata may include snapshot information, wherein a snapshot provides information that enables execution of an instance of the gaming application beginning from a point in the gaming application associated with the capture of the corresponding snapshot. A full discussion on the creation and use of snapshots is provided within U.S. application Ser. No. 15/411,421, entitled "Method And System For Saving A Snapshot of Game Play And Used To Begin Later Execution Of The Game Play By Any User As Executed On A Game Cloud System," which was previously incorporated by reference in its entirety.

The metadata and/or information captured may provide and/or be analyzed to provide additional information related to the game play of the player 5. For example, metadata and/or information may help determine where the user (e.g., character of the user) has been within the gaming application, where the user is in the gaming application, what the user has done, what assets and skills the user has accumulated, and where the user will be going within the gaming application. This additional information may be used to generate contextually relevant content for display to the user in an interface 110. In particular, the metadata and/or information of player 5 may be used to build an emergent community that corresponds to player 5, wherein players in the emergent community are aware of the general game context of the game play of user 5 because each player is at a similar point in the gaming application (e.g., either physically or progression-wise). For example, user interface 110 may be used to provide social networking information, establish and manage communication between players of the social network, or may be used to generate content configured for interaction with other users (e.g., messages, etc.).

More particularly, the captured metadata and/or information may include game state data that defines the state of the game play at that point. For example, game state data may include game characters, game objects, game object attributes, game attributes, game object state, graphic overlays, etc. In that manner, game state data allows for the generation of the gaming environment that existed at the corresponding point in the game play of the gaming application. Game state data may also include the state of every device used for rendering the game play, such as states of CPU, GPU, memory, register values, program counter value, programmable DMA state, buffered data for the DMA, audio chip state, CD-ROM state, etc. Game state data may also identify which parts of the executable code need to be loaded to execute the gaming application from that point. The game state data may be stored locally or in game state database 145 of GCS 201.

The captured metadata and/or information also includes user saved data. Generally, user saved data includes information that personalizes the video game for the corresponding user. This includes information associated with the user's character, so that the video game is rendered with a character that may be unique to that user (e.g., shape, look, clothing, weaponry, etc.). In that manner, the user saved data enables generation of a character for the game play of a corresponding user, wherein the character has a state that corresponds to the point in the video game associated with the snapshot. For example, user saved data may include the game difficulty selected by the user 5 when playing the game, game level, character attributes, character location, number of lives left, the total possible number of lives available, armor, trophy, time counter values, and other asset information, etc. User saved data may also include user profile data that identifies user 5, for example. User saved data may be stored locally, or in database 141 in GCS 201.

In addition, the captured metadata and/or information may include random seed data that may be generated by an artificial intelligence (AI) module (not shown). The random seed data may not be part of the original game code, but may be added in an overlay to make the gaming environment seem more realistic and/or engaging to the user. That is, random seed data provides additional features for the gaming environment that exists at the corresponding point in the game play of the user. For example, AI characters may be randomly generated and provided in the overlay. The AI characters are not associated with any users playing the game, but are placed into the gaming environment to enhance the user's experience. As an illustration, these AI characters may randomly walk the streets in a city scene. In addition, other objects maybe generated and presented in an overlay. For instance, clouds in the background and birds flying through space may be generated and presented in an overlay. The random seed data may be stored locally or stored in random seed database 143 of GCS 201.

In particular, client device 100 is connected to the dynamic social network builder and communications engine 310 so that player 5 is able to connect with other players in the corresponding emergent social community, wherein all players are playing the same gaming application and are at a similar point in the gaming application (either physically or progression-wise). As previously described, metadata and/or information is passed to the dynamic social network builder and communications engine 310 by either the local game title execution engine 111 or the remote game title execution engine 211 at the back-end GCS 210 to build a corresponding social community and establishing communications with other players in the emergent social community that is built based on player 5's in-game progress and/or map location within a gaming environment of the gaming application. User interface 110 of client device 100 is used to access the services provided by the dynamic social network builder and communications engine 310.

Figure 1B:
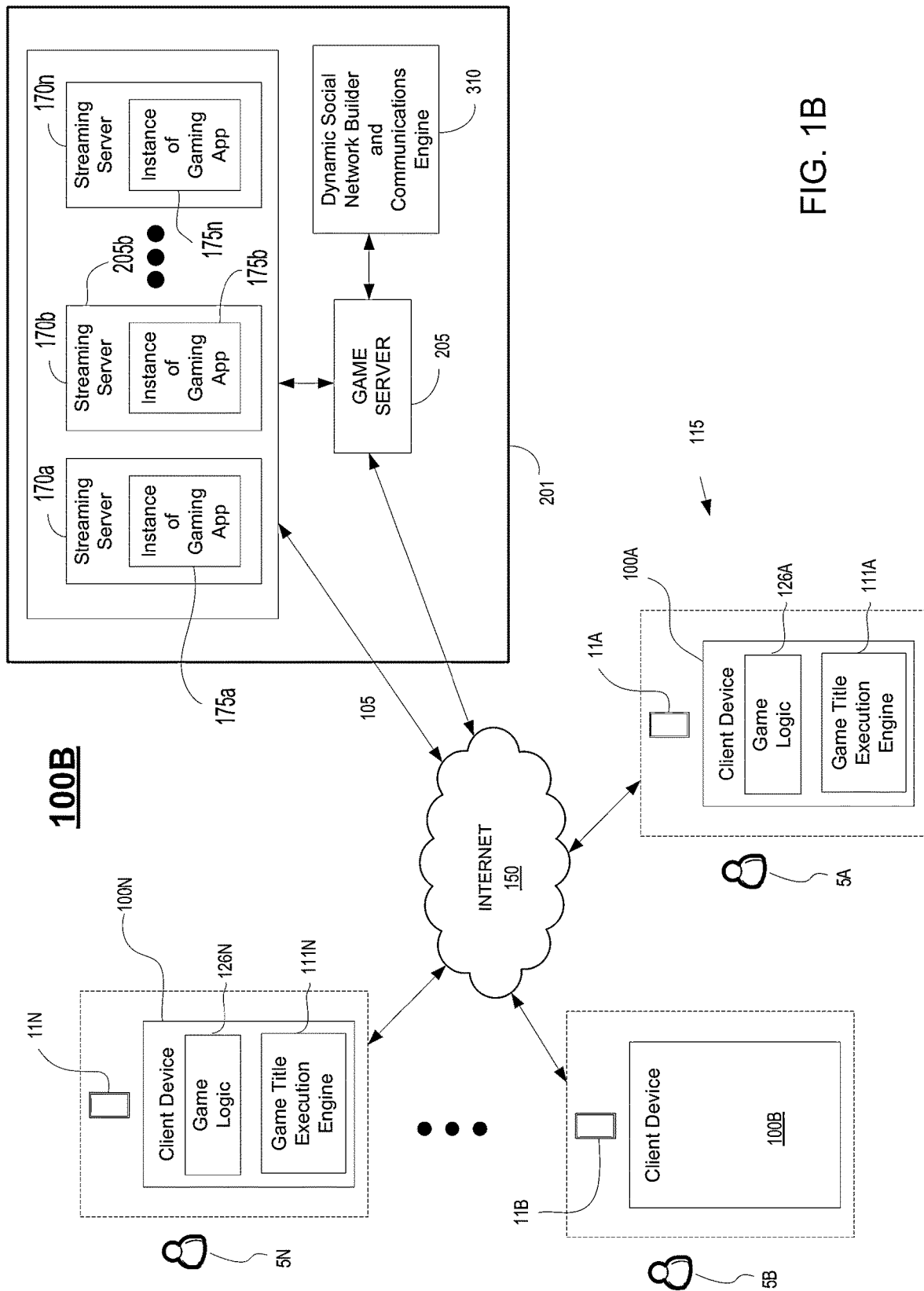
FIG. 1B illustrates a back-end gaming server configured to dynamically build social connections through emergent social communities based on in-game progression and/or map location in a gaming environment associated with a particular player playing a gaming application, in accordance with one embodiment of the present disclosure.

FIG. 1B illustrates a system 100B that includes a back-end engine 310 configured to dynamically build social connections through emergent social communities based on in-game progression and/or map location in a gaming environment associated with a particular player playing a gaming application, in accordance with one embodiment of the present disclosure. The particular player from which the emergent community is built can connect with other players in the community for a real-time mobile social experience revolving around similar game plays of the player in that community. Because players in the community are at a similar point in the gaming application (either physically or progression-wise).

As shown, system 100B provides gaming control to a plurality of players 115 (e.g., players 5A . . . 5N) playing a gaming application as executed over a cloud game network, in accordance with one embodiment of the present disclosure. In some embodiments, the cloud game network may be a game cloud system 201 that includes a plurality of virtual machines (VMs) running on a hypervisor of a host machine, with one or more virtual machines configured to execute a game processor module utilizing the hardware resources available to the hypervisor of the host.

In other embodiments, GCS 201 includes a distributed game engine system and/or architecture that are executing game logic, as configured as a corresponding instance of the gaming application. In general, the distributed game engine takes each of the functions of a game engine and distributes those functions for execution by a multitude of processing entities across one or more servers of the GCS 201. Individual functions can be further distributed across one or more processing entities. In particular, a distributed game engine executing game logic is configured as a corresponding instance of the gaming application. In general, the distributed game engine takes each of the functions of a game engine and distributes those functions for execution by a multitude of processing entities. Individual functions can be further distributed across one or more processing entities. The processing entities may be configured in different configurations, including as metal or physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the GCS 201, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g., video frames, audio, etc.) for the gaming application in response to controller input by a player. The distribution synchronization layer is able to efficiently execute (e.g., through load balancing) those functions across the distributed processing entities, such that critical game engine components/functions are distributed and reassembled for more efficient processing.

These various functions performed by a game engine include basic processor based functions for executing the gaming application and services associated with the gaming application. For example, processor based functions include 2D or 3D rendering, physics, physics simulation, scripting, audio, animation, graphics processing, lighting, shading, rasterization, ray tracing, shadowing, culling, transformation, artificial intelligence, etc. In addition, services for the gaming application include streaming, encoding, memory management, multi-thread management, quality of service (QoS), bandwidth testing, social networking, management of social friends, communication with social networks of friends, communication channels, texting, instant messaging, chat support, etc.

In addition, the distribution synchronization layer can easily be scaled (on an individual distributed game engine)

to handle increased processing demand or complexity of processing by adding more processing entities. That is, the processing power can be elastically increased or decreased based on demand. Also, the distributed game engine system can be scaled across many users, each of which is supported by a corresponding distributed game engine, such as in a multi-player gaming session for the gaming application. As such, the multi-player gaming session is not constrained by hardware limitations that limit the maximum number of players in the session because of performance issues (e.g., latency). Instead, the scalable distributed gaming engine system is able to scale up or down the number of distributed gaming engines depending on the number of players participating in the multi-player gaming session without any hardware constraints. As such, many thousands of players may participate in a single multi-player gaming session.

As shown, the GCS 201 includes a game server 205 that provides access to a plurality of interactive video games or gaming applications. Game server 205 may be any type of server computing device available in the cloud, and may be configured as one or more virtual machines executing on one or more hosts. For example, game server 205 may manage a virtual machine supporting a game processor that instantiates an instance of a gaming application for a user. More particularly, game server 205 may manage one or more streaming servers 170 (e.g., servers 170*a* through 170*n*) executing a plurality of instances of multiple gaming applications (e.g., instances 175*a* through 175*n*). As such, a plurality of game processors of game server 205 associated with a plurality of virtual machines is configured to execute a plurality of instances 175 of the gaming application associated with game plays of the plurality of users 115 as controlled through a corresponding client device. In particular, a plurality of streaming servers 170 (e.g., as virtual machines) is configured to execute a plurality of instances 175 of the gaming application. For example, streaming server 170*a* is configured to execute instance 175*a* of the gaming application, streaming server 170*b* is configured to execute instance 175*b* of the gaming application . . . streaming server 170*n* is configured to execute instance 175*n* of the gaming application. In that manner, back-end server support provides streaming of media (e.g., video, audio, etc.) of game plays of a plurality of gaming applications to a plurality of corresponding users.

Each of the streaming servers 170 may be configured as having at least a memory and a processor module that is capable of executing the gaming application, such as through a corresponding instance of the gaming application, in support of a corresponding game play. For example, each streaming server 170 may be a server console, gaming console, computer, etc. More particularly, an instance of a gaming application is executed by a corresponding game title execution engine (e.g., game engine) that is running game logic corresponding to the gaming application, as previously described. Each server 205 is configured to stream data 105 (e.g., rendered images and/or frames of a corresponding game play) either directly or through game server 205 back to a corresponding client device through network 150. In that manner, a computationally complex gaming application may be executing at the back-end server in response to controller inputs received and forwarded by a corresponding client device. Each server is able to render images and/or frames that are then encoded (e.g., compressed) and streamed to the corresponding client device for display.

A plurality of players 115 accesses the GCS 201 via network 150, wherein players (e.g., players 5L, 5M . . . 5Z) access network 150 via corresponding client devices 100A . . . 100N. Each of client device 100A through 100N may be configured similarly as client device 100 of FIG. 1A, or may be configured as a thin client (e.g., client device 100B) providing interfaces with a back end server providing computational functionality. Corresponding client device 100 can be any type of computing device having at least a memory and a processor module that is capable of connecting to the game server 205 over network 150. Also, corresponding client device 100 is configured for generating rendered images executed by game title execution engine 111 executing locally, or executed by the game title execution engine 211 executing remotely, and for displaying the rendered images on a display, including a head mounted display (HMD) (not shown). As previously described, each of client devices 100 may receive input from various types of input devices 11, such as game controllers, tablet computers, keyboards, gestures captured by video cameras, mice touch pads, etc. For example, a client device 100A of a corresponding player 5A is configured for requesting access to gaming applications over a network 150, such as the internet, and for rendering data of a particular gaming application (e.g., video game) executed by the a corresponding steaming server 170*a* through 170*n*, as managed by gaming server 205 and delivered to a display device associated with the corresponding player 5A. As such, player 5A may be interacting through client device 100A with an instance of a gaming application executing on a corresponding streaming server as managed by game server 205.

As previously introduced, game state and/or information of the game plays of the plurality of users 115 playing the same gaming application can be used by the dynamic social network builder and communications engine 310 to build social connections through emergent social communities based on in-game progression and/or map location in a gaming environment associated with a particular player playing a gaming application. In that manner, players in the community can connect with each other for a real-time mobile social experience revolving around their similar game plays of the same gaming application, as previously described. In that manner, a particular player can connect with other players in a community that is built specifically for that particular player to create a real-time mobile social experience between players playing the same gaming application at the same time. The connections can be made directly between players, or through a group channel The particular player can ask for help, talk about the gaming application, get official news, or talk about anything that is interesting for example around the gaming application, all without fear of revealing sensitive information about the gaming application. Corresponding user interfaces on corresponding client devices 100 or through separate devices 11 may help to connect the particular player to other players in the emergent community.

Figure 2:
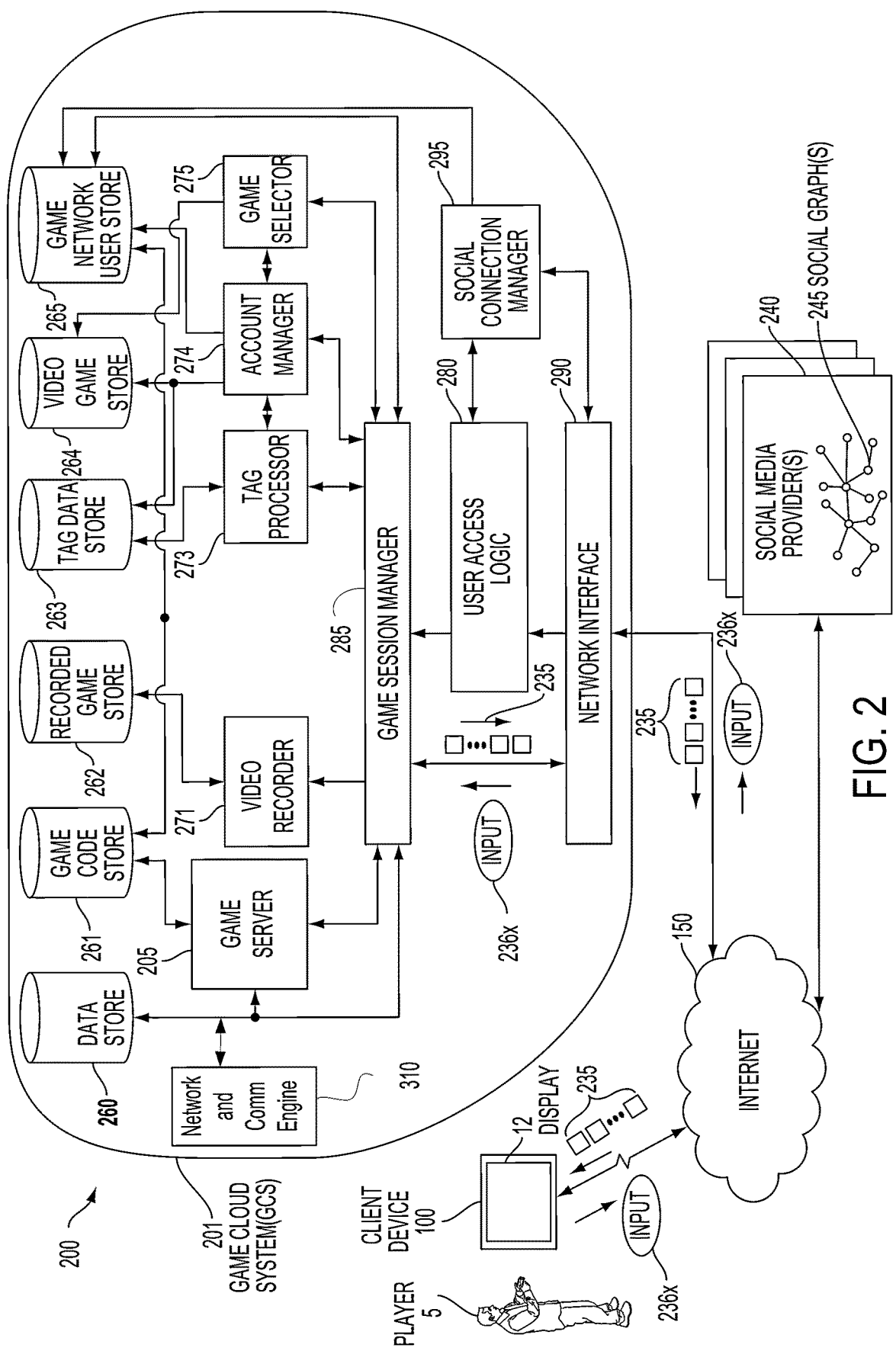
FIG. 2 illustrates a system diagram 200 to provide gaming over a cloud game network, wherein the cloud game network is configured to dynamically build social connections through emergent social communities based on in-game progression and location associated with a particular player, in accordance with one embodiment of the present disclosure.

FIG. 2 illustrates a system 200 supporting the building of instant social connections and emergent communities based on in-game progression and/or map location of a particular player, and the establishing and managing of communications between players in the emergent communities, in accordance with one embodiment of the present disclosure. In particular, system diagram 200 enables access and playing of gaming application stored in a game cloud system (GCS) 201. Generally speaking, game cloud system GCS 201 may be a cloud computing system operating over a network 220 to support a plurality of players playing a gaming application through corresponding game plays. Data related to those game plays may be provided to build an emergent community used for making social connections, wherein the emergent community is built based on in-game progression and/or map location of a particular player. In particular, system 200 includes GCS 201, one or more social media providers 240, and a client device 230, all of which are connected via a network 150 (e.g., internet). One or more user devices may be connected to network 150 to access services provided by GCS 201 and social media providers 240.

In one embodiment, game cloud system 201 includes a game server 205, a video recorder 271, a tag processor 273, and account manager 274 that includes a user profile manager, a game selection engine 275, a game session manager 285, user access logic 280, a network interface 290, and a social media manager 295. GCS 201 may further include a plurality of gaming storage systems, such as a game state store, random seed store, user saved data store, snapshot store, which may be stored generally in datastore 260. Other gaming storage systems may include a game code store 261, a recorded game store 262, a tag data store 263, video game data store 264, and a game network user store 265. In one embodiment, GCS 201 is a system that can provide gaming applications, services, gaming related digital content, and interconnectivity among systems, applications, users, and social networks. GCS 201 may communicate with user device 230 and social media providers 240 through social media manager 295 via network interface 290. Social media manager 295 may be configured to relate one or more friends. In one embodiment, each social media provider 240 includes at least one social graph 245 that shows user social network connections.

Player/user 5 is able to access services provided by GCS 201 via the game session manager 285. For example, account manager 274 enables authentication and access by player 5 to GCS 201. Account manager 274 stores information about member users/players. For instance, a user profile for each member user may be managed by account manager 274. In that manner, member information can be used by the account manager 274 for authentication purposes. For example, account manager 274 may be used to update and manage user information related to a member user. Additionally, game titles owned by a member user may be managed by account manager 274. In that manner, video games stored in data store 264 are made available to any member user who owns those video games.

In one embodiment, a user, e.g., player 5, can access the services provided by GCS 201 and social media providers 240 by way of client device 100 through connections over network 150. Client device 100 can include any type of device having a processor and memory, wired or wireless, portable or not portable. In one embodiment, client device 100 can be in the form of a smartphone, a tablet computer, or hybrids that provide touch screen capability in a portable form factor. One exemplary device can include a portable phone device that runs an operating system and is provided with access to various applications (apps) that may be obtained over network 150, and executed on the local portable device (e.g., smartphone, tablet, laptop, desktop, etc.).

Client device 100 includes a display 12 that acts as an interface for player 5 to send input commands 236 and display data and/or information 235 received from GCS 201 and social media providers 240. Display 12 can be configured as a touch-screen, or a display typically provided by a flat-panel display, a cathode ray tube (CRT), or other device capable of rendering a display. Alternatively, the client device 100 can have its display 12 separate from the device, similar to a desktop computer or a laptop computer.

In one embodiment, client device 100 is configured to communicate with GCS 201 to enable player 5 to play a video game or gaming application. For example, player 5 may select (e.g., by game title, etc.) a gaming application that is available in the video game data store 264 via the game selection engine 275. In that manner, the selected gaming application is enabled and loaded for execution by game server 205 on the GCS 201. In one embodiment, game play is primarily executed in the GCS 201, such that client device 100 will receive a stream of game video frames 235 from GCS 201, and user input commands 236 for driving the game play is transmitted back to the GCS 201. The received video frames 235 from the streaming game play are shown in display 12 of client device 100.

In one embodiment, after player 5 chooses an available game title to play, a game session for the chosen game title may be initiated by the player 5 through game session manager 285. Game session manager 285 first accesses game state store in data store 140 to retrieve the saved game state of the last session played by the player 5 (for the selected game), if any, so that the player 5 can restart game play from a previous game play stop point. Once the resume or start point is identified, the game session manager 285 may inform game title execution engine in game server 205 (e.g., managing the instances of the gaming application as executed by a game engine and game logic over a virtual machine) to execute the game code of the chosen game title from game code store 261. After a game session is initiated, game session manager 285 may pass the game video frames 235 (i.e., streaming video data), via network interface 290 to a client device, e.g., client device 100.

During game play, game session manager 285 may communicate with game server 205, recording engine 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data store 263.

During game play, game session manager 285 may communicate with game server 205 to deliver and obtain user input commands 236 that are used to influence the outcome of a corresponding game play of a video game. Input commands 236 entered by player 5 may be transmitted from client device 100 to game session manager 285 of GCS 201. Input commands (e.g., controller inputs) 236, including input commands used to drive game play, may include user interactive input, such as including tag content (e.g., texts, images, video recording clips, etc.). Game input commands as well as any user play metrics (how long the user plays the game, etc.) may be stored in game network user store. Select information related to game play for a video game may be used to enable multiple features that may be available to the user.

Figure 3A:
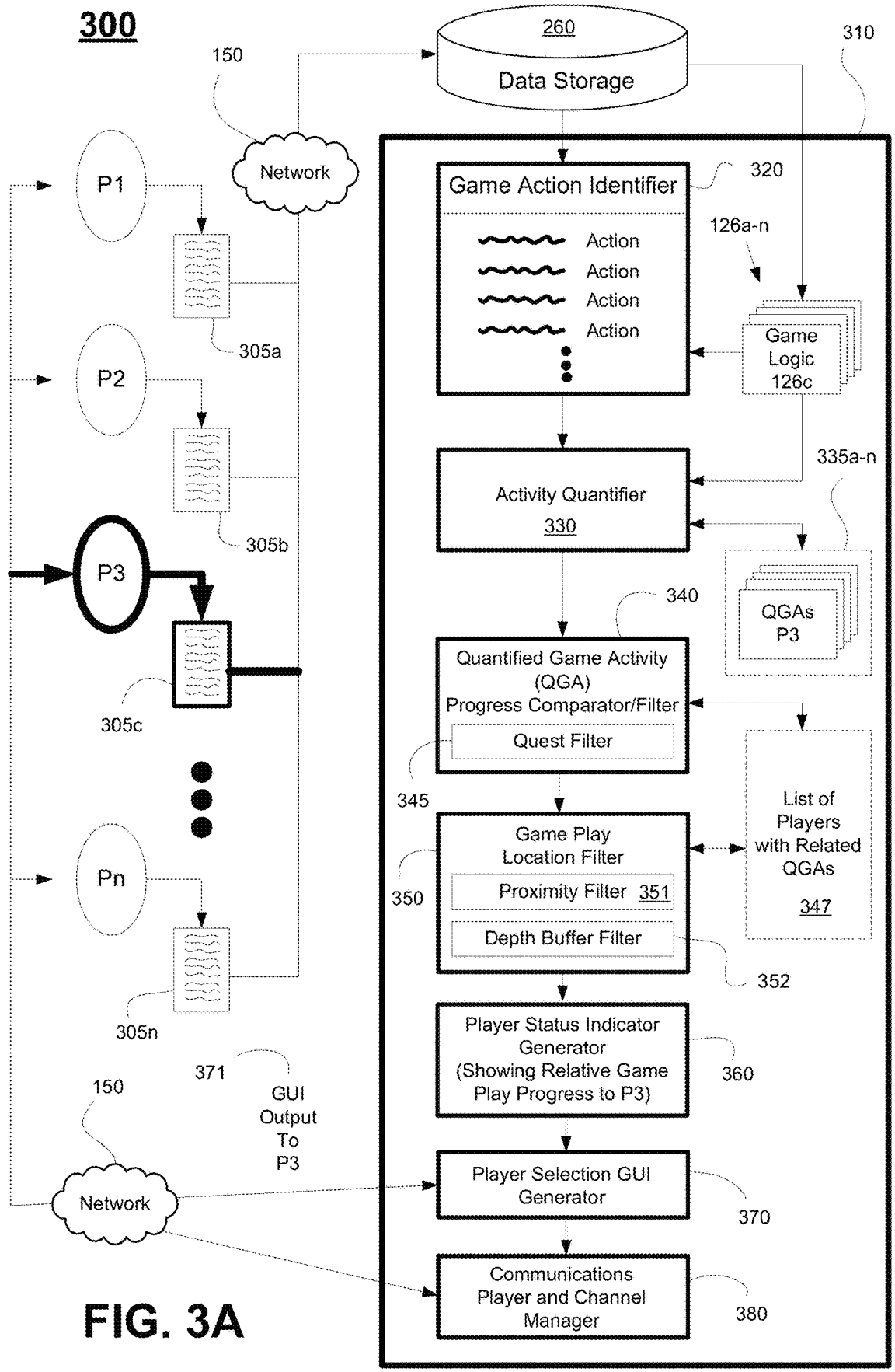
FIG. 3A is a block diagram of a social network building engine at a central server that is configured to dynamically build social connections through emergent social communities based on in-game progression and location associated with a particular player, in accordance with one embodiment of the present disclosure.

FIG. 3A is a block diagram of a system 300 including a social network building and communications engine 310 at a central server that is configured to dynamically build social connections through emergent social communities based on in-game progression and location associated with a particular player (e.g., player P3), in accordance with one embodiment of the present disclosure. FIG. 3A may be implemented within systems 100A and 100B of FIGS. 1A-1B and system 200 of FIG. 2 in embodiments.

As shown, players P1 through Pn are each playing the same gaming application at the same time, wherein the game plays are supported by the back-end server including the social network building and communications engine 310. Each of the players P1 through Pn has a corresponding game play of the gaming application. In addition, game state data for each of the game plays is captured and delivered to the social network building and communications engine 310 for purposes of dynamically building an emergent community based on in-game progression of game play for a particular player and/or a current map location of shown in the game play for that particular player. For purposes of illustration only, the emergent community is based on the in-game progression and/or location of player P3. In particular, the game play of player P1 playing the gaming application continually generates game state 305a. Also, the game play of player P2 playing the same gaming application continually generates game state 305b, the game play of player P3 (shown bolded) playing the gaming application continually generates game state 305c . . . and game play of player Pn playing the gaming application continually generates game state 305n. For example, game states 305a through 305n for the players P1 through Pn are delivered over network 150 and stored in data storage 260 of the GCS 201, previously introduced in FIG. 2.

The game state 305a through 305n of the players P1 through Pn playing the same gaming application are used to build social connections for player P3 through a corresponding emergent community based on the in-game progression and/or map location of the game play of player P3. In particular, the game states 305a through 305n are delivered to game action identifier, which is configured to identify quantified actions performed during the game plays of the players P1 through Pn playing the same gaming application. For example, an action may include walking, jumping, entering a room, closing a door, picking up an object, etc. The actions may be quantified through recognition of input controls, for example, that generate corresponding actions. Certain actions may be important to the gaming application (e.g., entering a particular room). Performing an important action may be considered an achievement. Other actions may not be that important to the gaming application, such as general walking through a gaming environment. As such, game action identifier 320 is able to identify each of the actions taken during each of the game plays of the players P1 through Pn. Game actions may be predefined by the game logic of a corresponding application (e.g., selected from game logics 126a-126n). For example, the players P1 through Pn may be playing a gaming application having game logic 126c. In addition, actions may be assigned to their corresponding game plays of the players P1 through Pn.

Figure 3B:
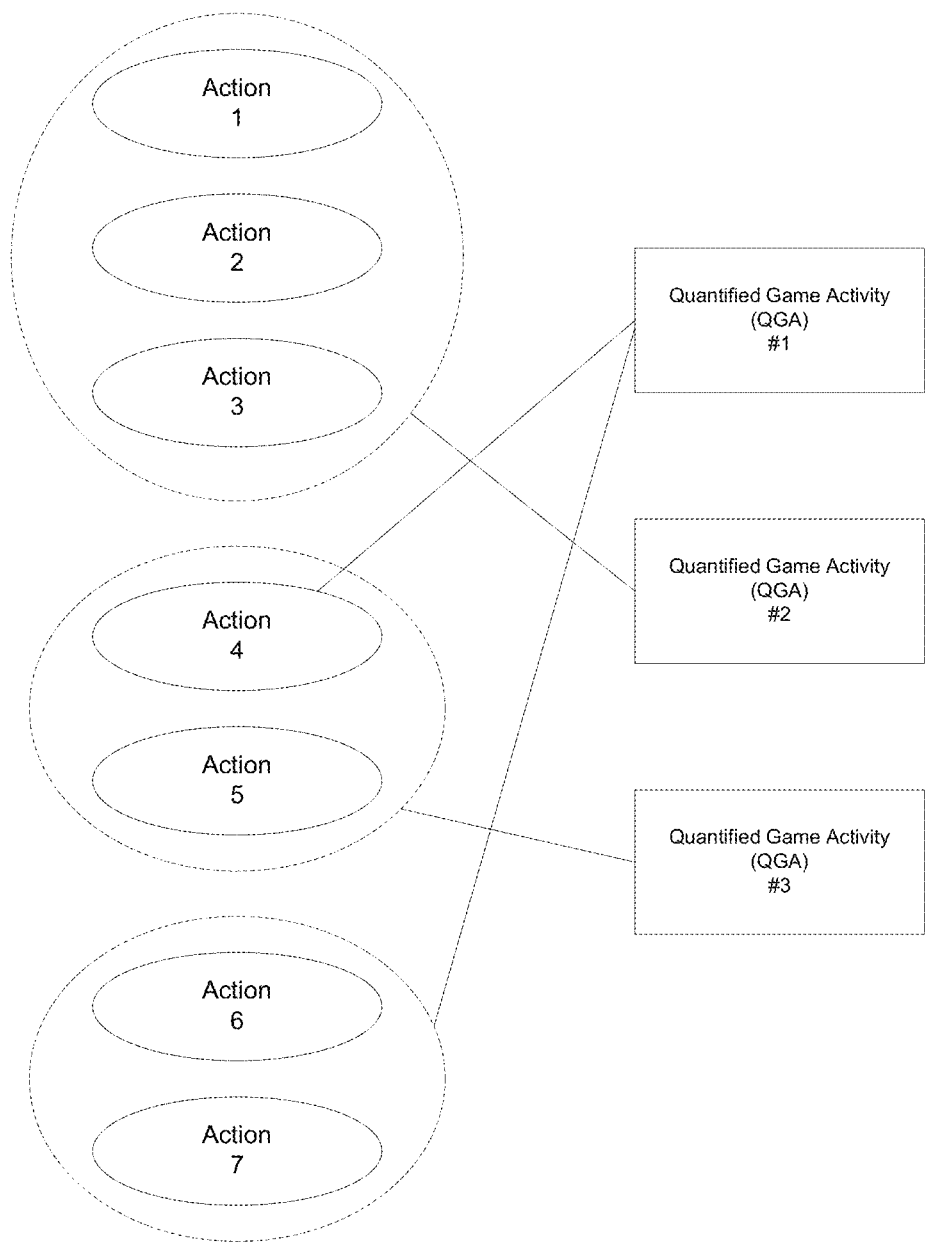
FIG. 3B illustrates the interrelationship between actions and a quantified game activity, in accordance with one embodiment of the present disclosure.

In addition, one or more actions in combination as performed within a particular game play for a corresponding player may generate a corresponding quantified game activity (QGA). QGAs may be predefined by the game logic of a corresponding application. For example, the players P1 through Pn may be playing a gaming application having game logic 126c, which defines QGAs based on actions performed in the game play. In another embodiment, the QGAs may be learned through application of artificial intelligence. FIG. 3B illustrates the interrelationship between actions and a quantified game activity, in accordance with one embodiment of the present disclosure. For example, a limited set of actions 1-7 are provided, and when taken alone or in combination define one or more QGAs 1-3. In particular, QGA #1 is defined by actions 4-7; QGA #2 is defined by actions 1-3, and QGA #3 is defined by actions 4-5.

In particular, activity quantifier 330 is able to identify QGAs from the actions that were previously identified by identifier 320. That is, the activity quantifier 330 using one or more game logics is configured to output QGAs for each of the players P1 through Pn, and as such the QGAs are assigned to corresponding game plays of corresponding players P1 through Pn. In that manner, QGAs for each game play are identified and collected. For example, as shown in FIG. 3A, the QGAs for the game play player P3 are identified and collected. Other QGAs for game plays of other players are also identified and collected.

As such, the game plays of players P1 through Pn can be tracked based on the collected QGAs for each game play of corresponding players. For example, by tracking game plays, embodiments of the present disclosure are able to determine where in the gaming environment each player is currently interacting, in real-time. In particular, current map locations of characters being played by the players in their game plays can be determined and tracked. These locations can be over a general area, such as by village, town, realm, region, etc. These locations can be defined having higher resolution, to include map coordinates (e.g., x, y, z) within the gaming environment. Also, current quests for each player can be determined and tracked including tracking progress through a corresponding quest for a corresponding player. Overall in-game progress through the gaming application can be determined and tracked for each player.

As shown, the QGAs for each of the game plays of players P1 through Pn are passed to the QGA progress comparator/filter 340 which is configured to filter the players P1 through Pn to build an emergent community that is created for the benefit of player P3. In particular, QGA progress comparator/filter 340 determines which players P1 through Pn have a corresponding in-game progress and/or map location of their game play that is similar to the in-game progress and/or map location of the game play of player P3. In that manner, a community specifically built for the benefit of player P3 dynamically emerges and includes other players that may be playing the same gaming application simultaneously with the game play of player P3, and having similar experiences (e.g., in-game progression, map locations, etc.) in their game plays as player P3. A list of players with related QGAs 347 may be created and defines players within an emergent community that is built for player P3.

In one embodiment, the filtering performed by the QGA progress comparator/filter 340 may be based on similar quests being conducted by players in the emergent community, as performed by quest filter 345. For example, player P3 may be currently engaging with "Quest BB" and may want to discuss that quest with other players in a social environment (e.g., for purposes of pleasure, for assistance, etc.). Other players P1 through Pn that are also currently on that quest may be included within the emergent community built for player P3. The quest filtering may be a stand-alone filter, or provide additional filtering to the ink-game progress and/or map location filtering previously described. The filtering performed groups players that have similar experiences and knowledge of the quest (when the quest filter is applied), such that player P3 can communicate with other players in the emergent community with limited risk that sensitive information may be revealed, as previously described. The list of players with related QGAs 347 may be created and/or updated based on the results from the QGA progress comparator/filter 340.

Additional filtering based on map locations of corresponding game plays may be performed, such as by the game play location filter 350. In particular, filtering may select game plays that are currently engaging within a particular area, or region, or point in a gaming environment of the gaming application that is similar to that of player P3. For example, player P3 may be located in a region (e.g., Velen in the Witcher 3 gaming application), and more particularly in a town of the region (e.g., Blackbough located in Velen). Other players in that area or region may be selected by the game play location filter 350 for inclusion in the emergent community built for player P3. The list of players with related QGAs 347 may be created and/or updated based on the results from the game play location filter 350.

Figure 7A:
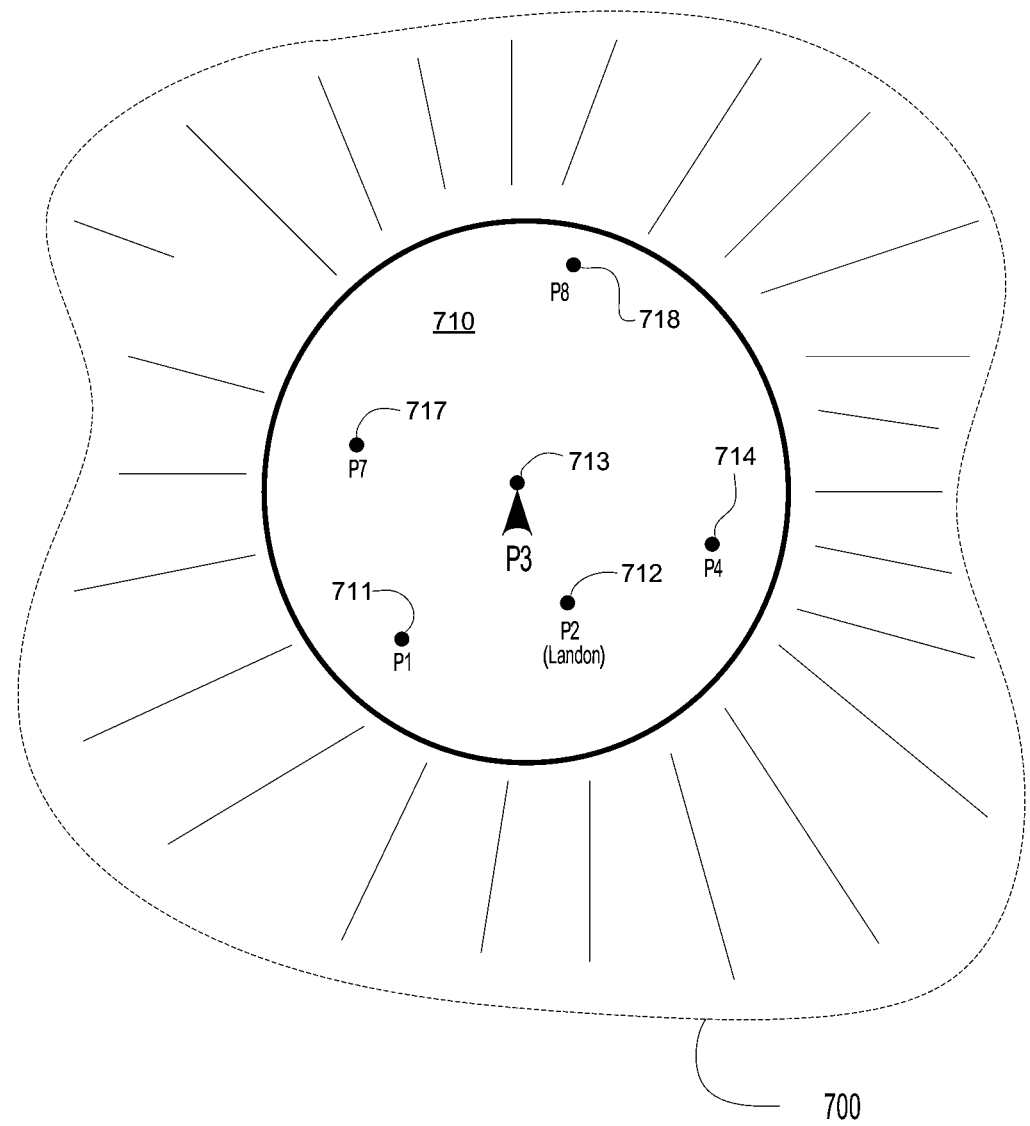
FIG. 7A illustrates players within an emergent social community that is built based on a game play location associated with that particular player, in accordance with one embodiment of the present disclosure.

Game play location filter 350 may include a proximity filter 351 configured to provide filtering based on proximity to a map location in a gaming environment of the game play of player P3 (e.g., a map location of a character controlled by player P3), in accordance with one embodiment of the present disclosure. Determining proximity may be based on a predefined distance, such that map locations of game plays of other players (e.g., map locations of characters controlled by those other players in their game plays) within the gaming environment is within the predefined distance. For example, the predefined distance may be 50 meters within a measurement system of the gaming environment. The predefined distance may be less than the aforementioned 50 meters, or more than the aforementioned 50 meters. FIG. 7A provides an illustration of players (e.g., P1, P2, P4, P7 and P8) that are within a proximity of player P3 within a gaming environment 700 of a corresponding gaming application. The list of players with related QGAs 347 may be created and/or updated based on the results from the proximity filter 351.

Figure 7B:
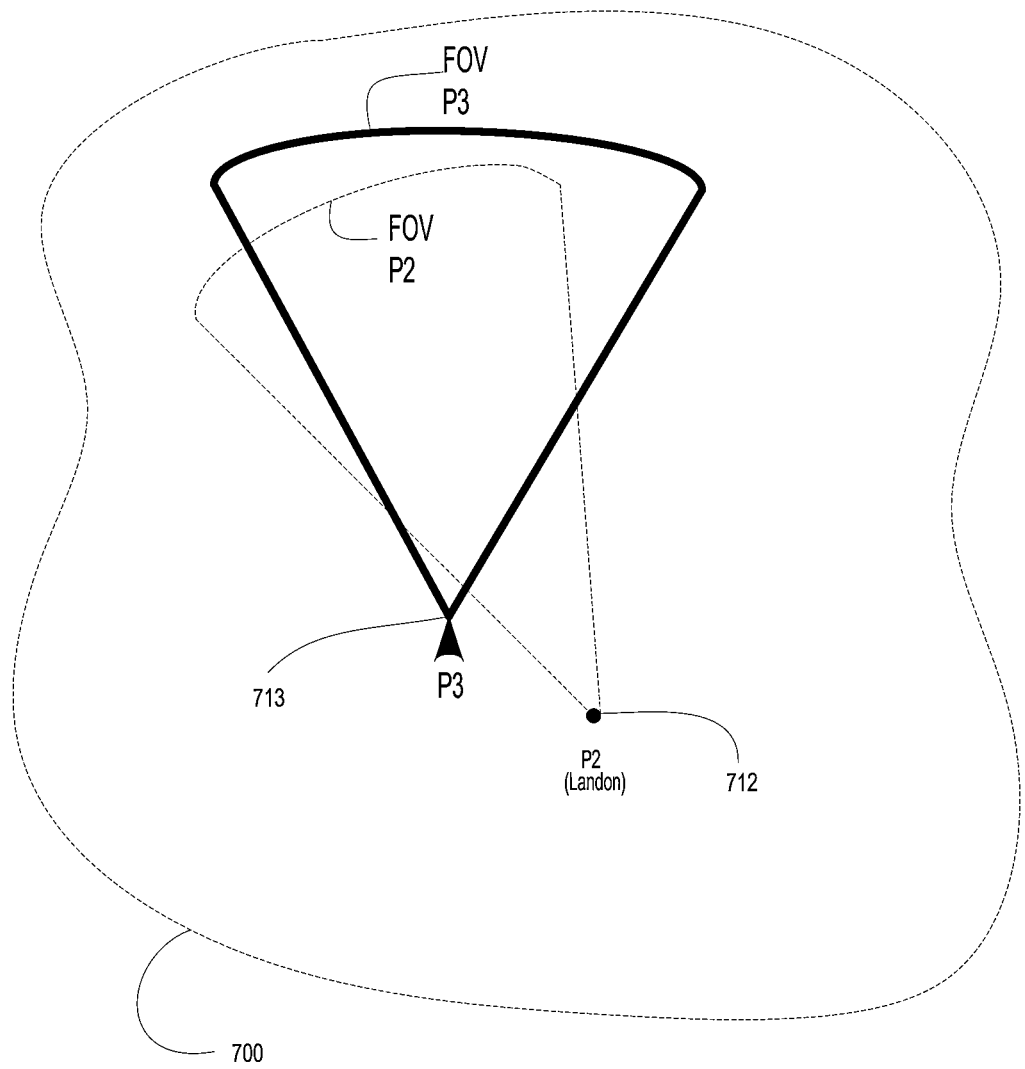
FIG. 7B illustrates players within an emergent social community that is built based on a game play location associated with that particular player, and that is further filtered by a common field of view, in accordance with one embodiment of the present disclosure.

Game play location filter 350 may include a depth buffer filter 352 configured to provide filtering based on field of view (FOV) and/or depth buffering within the gaming environment, in accordance with one embodiment of the present disclosure. In particular, depth buffer filter 352 may apply FOV filtering such that FOVs within game plays of other players (as viewed from characters controlled by those other players) that is similar to an FOV in the game play of player P3 is selected for inclusion within the emergent community built for player P3. FIG. 7B provides an illustration of a FOV of player P3 and a FOV of another player that is similar to the FOV of player P3, wherein the other player is selected for inclusion in the emergent community. In particular, FOV of the other player is slightly offset from the FOV of player P3 within a gaming environment 700 of a corresponding gaming application. In one embodiment, FOV filtering may not include depth buffering to determine whether full visibility is possible. The list of players with related QGAs 347 may be created and/or updated based on the results from the depth buffer filter 352.

Figure 7C:
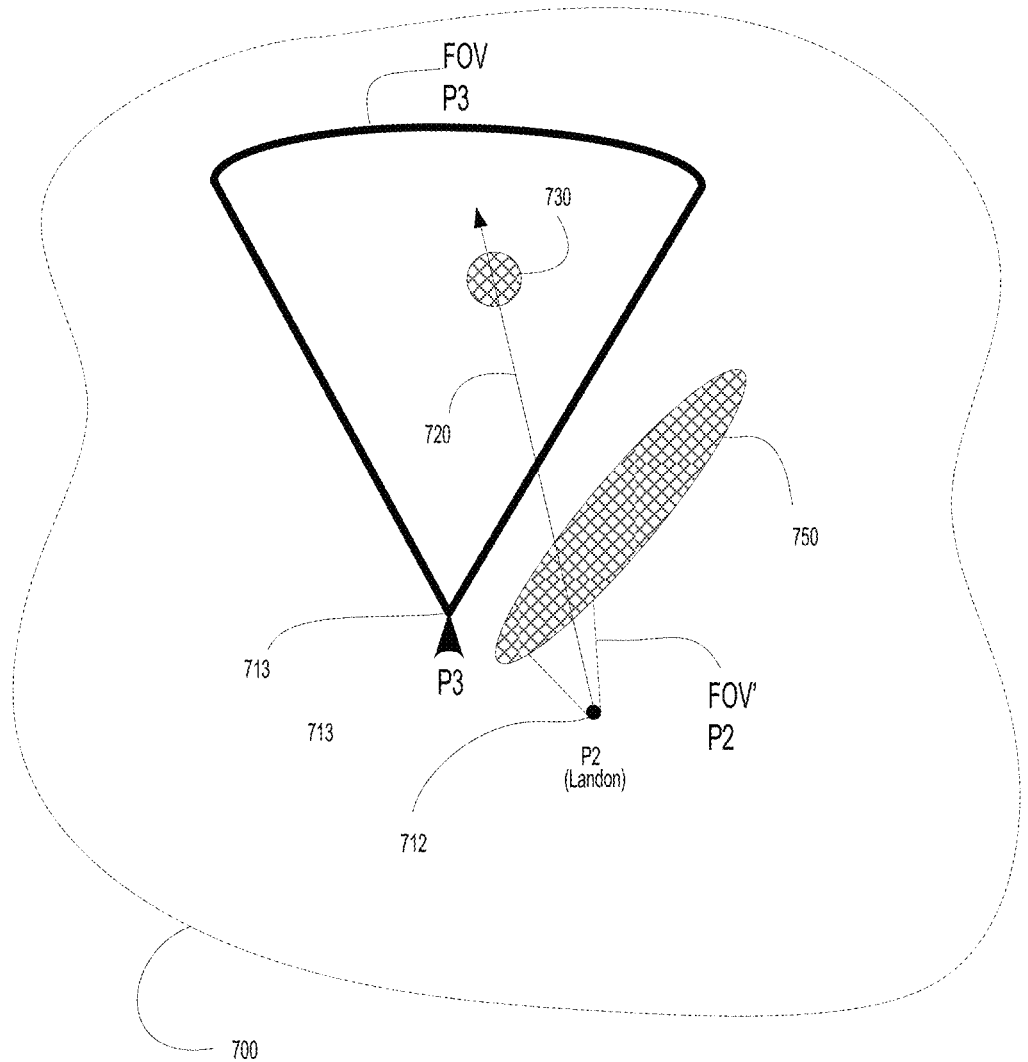
FIG. 7C illustrates players within an emergent social community that is built based on a game play location associated with that particular player, and that is further filtered using a depth buffer to ensure that the players share a field of view, in accordance with one embodiment of the present disclosure.

The depth buffer filter 352 may also perform additional depth buffering (e.g., Z-buffering) that determines whether full visibility is possible within a particular FOV in a gaming environment, or whether there is an intervening object that blocks the FOV. FIG. 7C illustrates the use of depth buffering to eliminate a player from the emergent community built for player P3. For example, player P3 and another player P2 may have similar FOVs within a gaming environment 700. Player P3 is able to view a particular point in the gaming environment (e.g., a point where treasure is hidden). However, the view of player P2 to that point is obstructed by an object (e.g., a wall). As such, player P2 cannot view the point where the treasure is hidden, and player P2 is not included in the emergent community where player P3 may want to ask another in the community to ask about the treasure. The list of players with related QGAs 347 may be created and/or updated based on the results from the depth buffer filter 352.

Figure 5A:
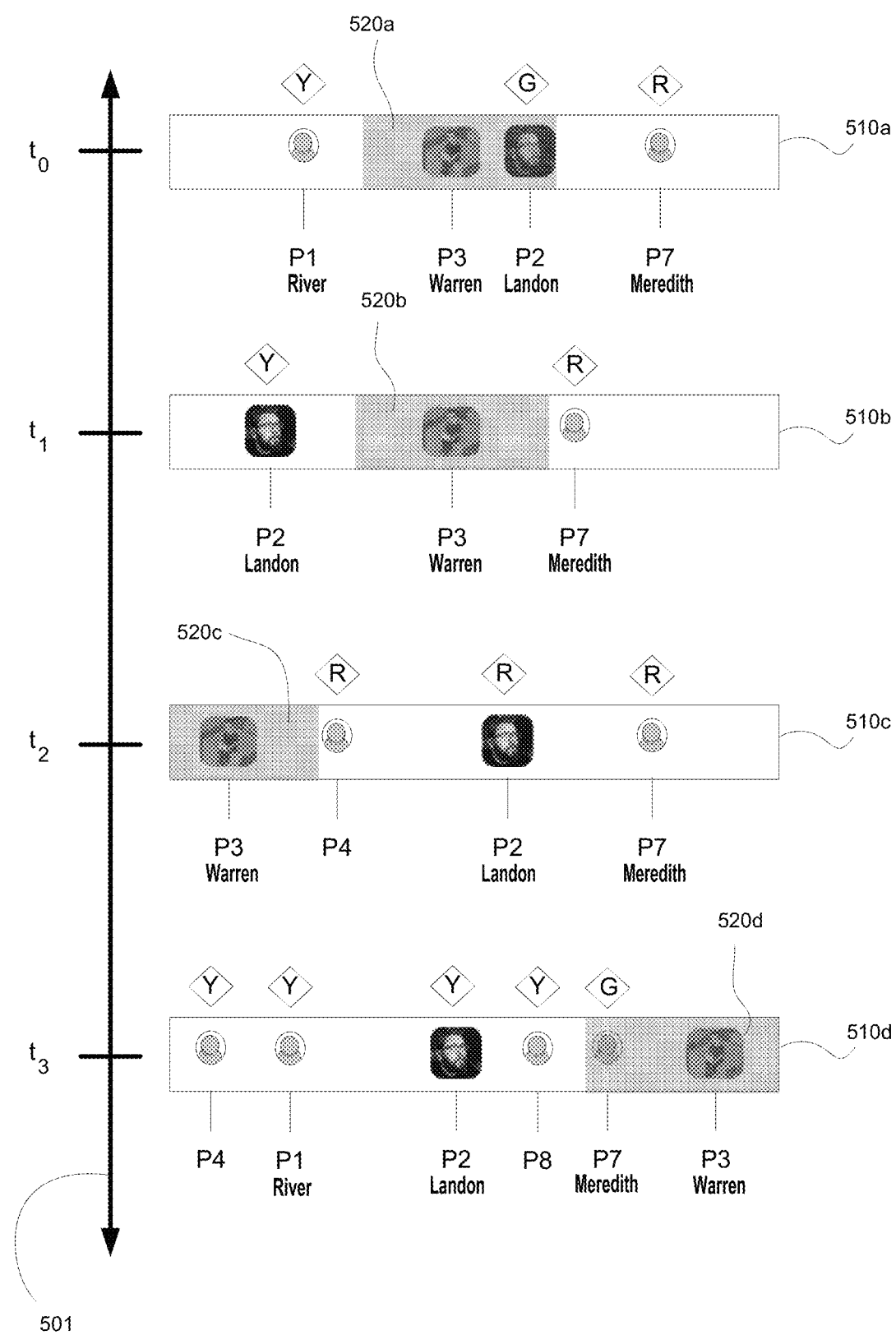
FIG. 5A illustrates a collection of quantified game activity (QGA) progressions created at various points in time, wherein the QGA progressions of one or more players in an emergent social community is shown in relation to a QGA progression of a particular player, wherein the emergent social community is built based on in-game progression and location associated with that particular player, in accordance with one embodiment of the present disclosure.

Players that are filtered and included in the emergent community built for player P3 may still have some sensitive information that P3 may not wish to know. Also, player P3 may have some sensitive information that other players in the community may not wish to know. This may be because game plays of these players are not exactly the same, and while in-game progress and/or map location may be similar, they are not identical. As such, the game plays of all the players in the emergent community may have similar game play experience and knowledge, but similarity still allows for differences in experience and knowledge such that some players may have additional experience and knowledge. In one embodiment, the player status indicator generator 360 is configured to show relative game play progress of players within the emergent community with respect to player P3. This relative progress may indicate whether another player is ahead of, at approximately the same point, or behind player P3, in terms of corresponding in-game progress. As such, player P3 is able to determine based on relative progress indicators whether or not to join a communication with another player or to be careful when joining a communication, such as in a one-to-one direct chat over a direct channel, or in a group chat over a group channel For example, an indicator may show that the in-game progression of another player is ahead of player P3, such that player P3 may be extra careful (beware of spoilers!) when communicating with that player to avoid learning sensitive information. Also, an indicator may show that the in-game progression of another player is behind player P3, such that player P3 may be careful (don't spoil anything for them!) not to reveal sensitive information that player. FIG. 5A illustrates the use of progress indicators for players in an emergent community built for player P3.

The dynamic social network building and communications engine 310 includes a GUI generator 370 configured to create a GUI 371 used to convey a list of players included in the emergent community built for player P3, and provide additional information about players in that list (e.g., progress indicators, quest, map location, etc.). The GUI may also be used for accessing one or more channels that are established to enable communication between players in the emergent community built for player P3. Players in the emergent community are at approximately the same place in the game (either physically or progression-wise). This helps mitigate the risk of spoilers being revealed within communications between players in the community. For example, communications manager 380 is configured to establish and manage one or more channels, including direct channels each enabling communication between a pair of players, and including group channels configure to enable communication between players in a group. The GUI may enable selection by player P3 of the type of channel requested to enable communication, wherein once selected the communication player and channel manager controls communication over those selected channels.

In one embodiment, players in the emergent community are simultaneously playing the same gaming application. That is, player P3 is playing the gaming application at the same time as other players in the community. In that way, the communications between players in the community corresponds to real-time game play, as if everyone is playing the gaming application in a pseudo multi-player gaming session, where everyone is aware of what is going on in other player's game plays. In another embodiment, player P3 may not be currently playing the gaming application. However, the emergent community is still available to player P3 for purposes of communication based on where the game play was suspended. This allows player P3 to still chat with other players in a similar part of the game, and connect player P3 to other players based on shared experiences in the game as driven by in-game progression and/or map location of the game play of player P3. This builds a social connection and community around single player games that typically don't exist.

Figure 4A:
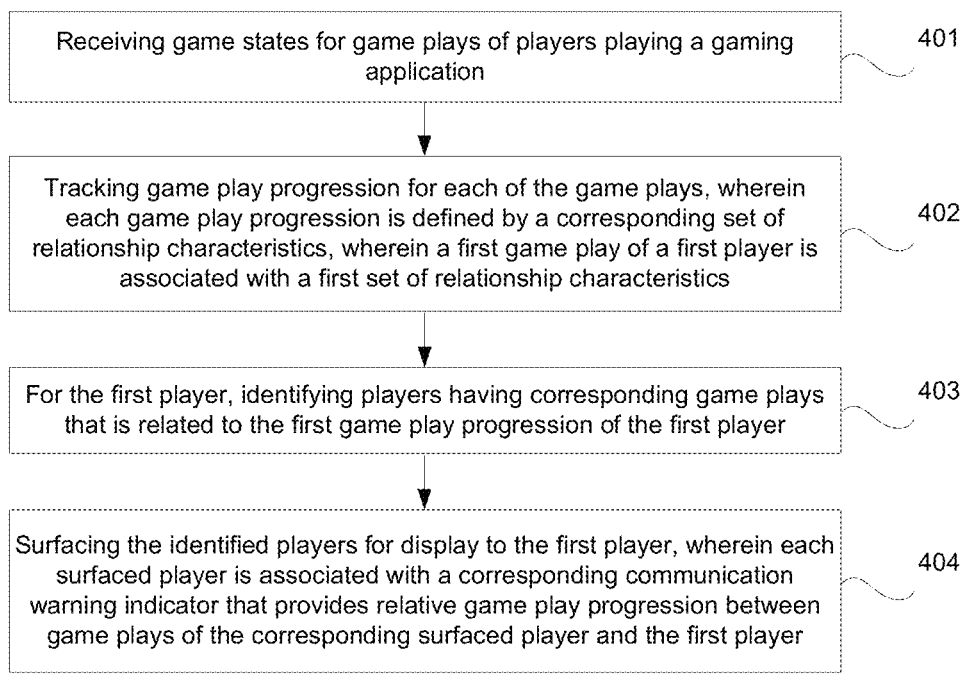
FIGS. 4A-4B are flow diagrams illustrating methods for gaming that connect a particular player of a gaming application to other players that are part of an emergent social community that is built based on in-game progression and/or map location associated with that particular player, in accordance with one embodiment of the present disclosure.

With the detailed description of the various modules of the systems 100A, 100B, and 200, flow diagram 400A of FIG. 4A discloses a method for gaming including building an emergent community for the benefit of a particular player (e.g., a first player) based on in-game progress and/or map location of the game play of that player, in accordance with one embodiment of the present disclosure. Flow diagram 400A may be implemented within a back-end server (e.g., within the game cloud system 201 in combination with the dynamic social network builder and communication engine 310), previously described.

In particular, at 401 the method includes receiving a plurality of game states for a plurality of game plays of a plurality of players playing a gaming application. The gaming application may be a single-player gaming application, in one implementation. One or more of the gaming applications may be executing on a local client device including a game title executing engine and game logic, as previously described. In another implementation, one or more of the gaming applications may be execution on a remote streaming server configured to perform the functions of the game title executing engine and game logic, as previously described. Game state defines the state of a corresponding game play at that point, and game states may be collected for a corresponding game play at one or more points. Game state data allows for the generation of the gaming environment that existed at the corresponding point in the game play of the gaming application. For example, game state may include game characters, game objects, game object attributes, game attributes, game object state, graphic overlays, the state of every device used for rendering the game play, etc.

At 402, the method includes tracking game play progression for each of the plurality of game plays based on the plurality of game states. Game play progression is defined by a corresponding set of relationship characteristics. A first game play of a first player is associated with a first set of relationship characteristics.

In one embodiment, a relationship characteristic comprises a quantified game activity (QGA). Further, each corresponding QGA includes a corresponding set of quantifiable actions. As such, a corresponding game play progression comprises a corresponding one or more achieved QGAs.

At 403, the method includes identifying for the first player one or more players, wherein each identified player has a corresponding game play that includes one or more relationship characteristics from the set of relationship characteristics for the first player. That is, game plays of identified players and the first player share relationship characteristics, such that their game plays are related.

For example, in embodiments social connections may be made between players in an emergent social community based on in-game activities, location, metadata, and other attributes, including but not limited to in-game progression, map location in a gaming environment associated with a gaming application (e.g., within a game play of a particular player), character attributes, etc. In particular, social connections may be established between players that have characters of the same race, same class, same configuration, similar character loadouts, and/or similar game play experiences (e.g., players who have beaten a certain type of enemy in their respective game plays of a particular gaming application).

At 404, the method includes surfacing the one or more identified players for display to the first player, wherein each of the surfaced players have a corresponding game play progression that is related to the first game play progression of the first player. For example, a graphical user interface (GUI) is generated for display to the first player. The GUI includes a list of the identified players. In one embodiment, the method includes surfacing a spectator for display to the first player, wherein the spectator is viewing the game play of a surfaced player. In that case, the spectator is also included in the list provided in the GUI. Players in the list may be selectable through the GUI for purposes of communication. In particular, the first player may be connected to at least one selected player that is surfaced (e.g., from the list) to enable communication. Also, the first player may be connected to a spectator that is surfaced.

Further, each corresponding player that is identified is associated with a corresponding communication warning indicator. The indicator provides relative game play progression between game plays of the corresponding player and the first player. In that manner, the first player understands whether the corresponding player is at, or behind or ahead in their game play of the gaming application (in their game play) with respect to the game play of the first player.

Figure 4B:
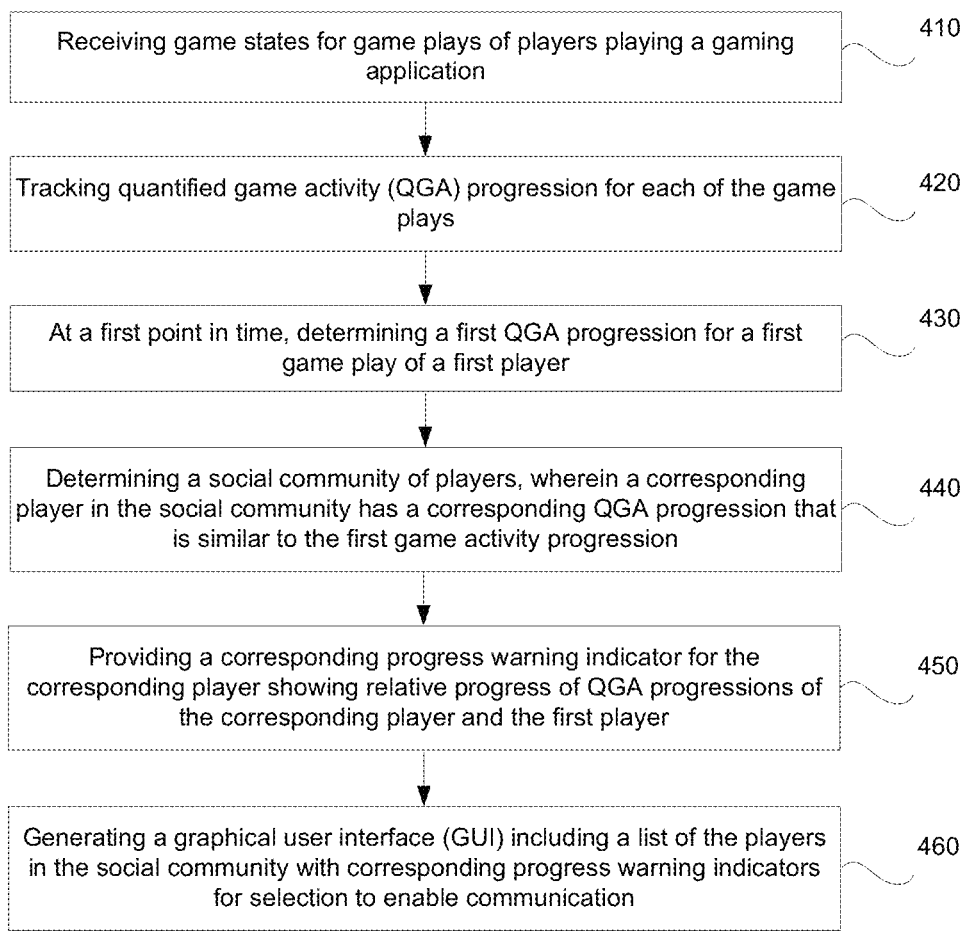

With the detailed description of the various modules of the systems 100A, 100B, and 200, flow diagram 400B of FIG. 4B discloses a method for gaming including building an emergent community for the benefit of a particular player (e.g., a first player) based on in-game progress and/or map location of the game play of that player, in accordance with one embodiment of the present disclosure. Flow diagram 400B may be implemented within a back-end server (e.g., within the game cloud system 201 in combination with the dynamic social network builder and communication engine 310), previously described.

In particular, at 410 the method includes receiving a plurality of game states for a plurality of game plays of a plurality of players playing a gaming application. The gaming application may be a single-player gaming application, in one implementation. One or more of the gaming applications may be executing on a local client device including a game title executing engine and game logic, as previously described. In another implementation, one or more of the gaming applications may be executing on a remote streaming server configured to perform the functions of the game title executing engine and game logic, as previously described. Game state defines the state of a corresponding game play at that point, and game states may be collected for a corresponding game play at one or more points. Game state data allows for the generation of the gaming environment that existed at the corresponding point in the game play of the gaming application. For example, game state may include game characters, game objects, game object attributes, game attributes, game object state, graphic overlays, the state of every device used for rendering the game play, etc.

At 420, the method includes tracking quantified game activity (QGA) progression for each of the plurality of game plays based on the plurality of game states. In particular, game state data may provide or may be analyzed to determine actions that are performed during the corresponding game state, as previously described. These actions are also tracked from corresponding game states of corresponding game plays. Actions may include certain actions performed by a character in the game play, such as walking, running, entering an area, opening a door, beating a boss, finding an object, etc. Other actions may be defined with more granularity as input controls provided to for execution by the gaming application instance including game logic and game engine. In addition, one or more actions may define a QGA, wherein each QGAs includes a quantifiable corresponding set of actions.

Figure 5B:
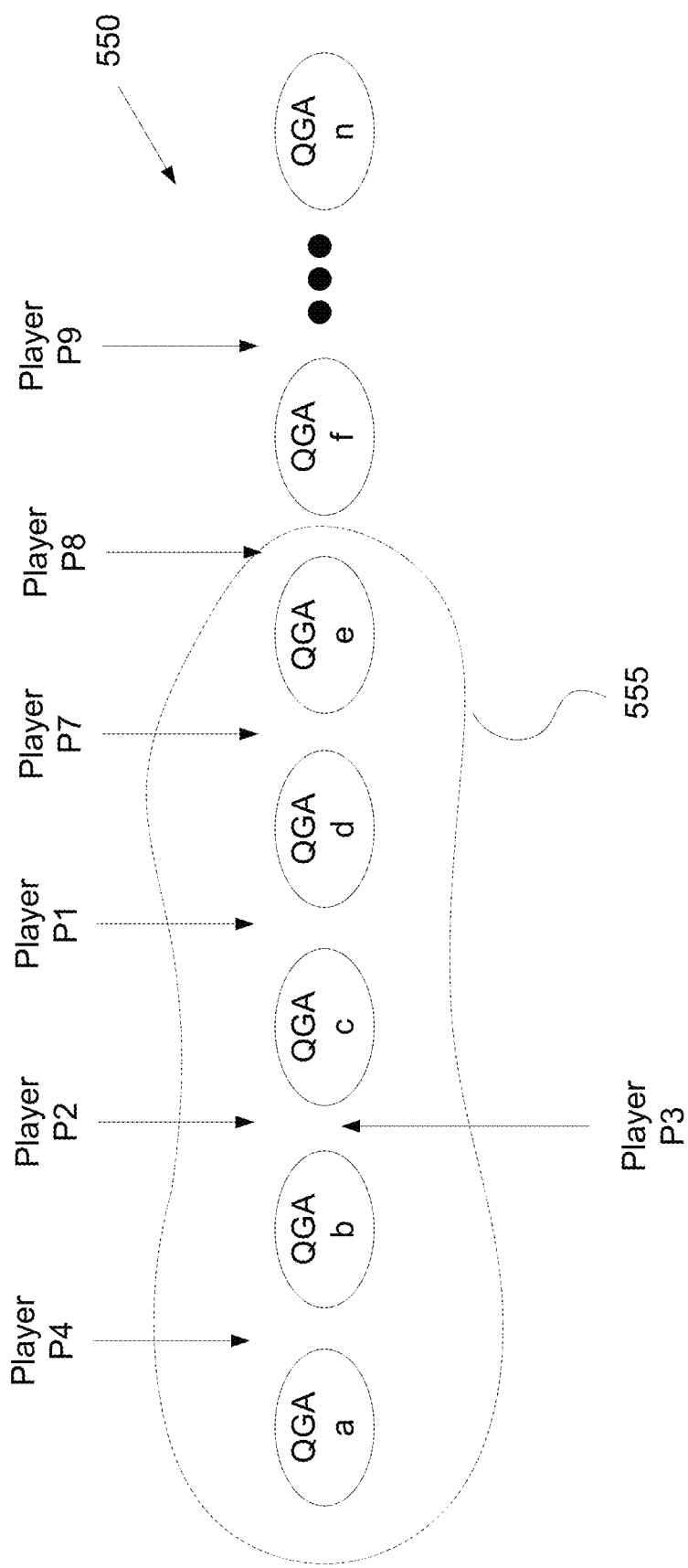
FIG. 5B illustrates the selection of one or more players for inclusion within an emergent social community that is built based on in-game progression and location associated with that particular player, in accordance with one embodiment of the present disclosure.

In that manner, by identifying QGAs for a particular game play, the achieved QGAs may be used to determine progression through a corresponding gaming application. In particular, one or more achieved QGAs may be determined and/or tracked for a corresponding game play. As such, the game play of players playing the same gaming application may be compared against each other based on achieved QGAs for each of the game plays. For example, FIG. 5B illustrates the selection of one or more players for inclusion within an emergent social community that is built based on in-game progression associated with a particular player (e.g., player P3), in accordance with one embodiment of the present disclosure. The gaming application may include one or more QGAs (e.g., QGA-a through QGA-n). Progress through the gaming application may be measured in one embodiment through achieved QGAs. The gaming application may be finished through linear or non-linear achievement of the QGAs. For example, in some gaming applications, the QGAs need to be tackled in a linear manner, while in other gaming applications, the QGAs can be tackled in a non-linear manner.

At 430, the method includes at a first point in time, determining a first QGA progression for a first game play of a first player (e.g., player P3) playing the gaming application. As shown in FIG. 5B, QGAs may be listed horizontally purely for illustration, wherein the achievement of QGAs may be illustrated depending on the marked position of a player. Achievement of QGAs may be used to define in-game progression of a corresponding player. For a given player, QGAs to the left of that player have been achieved, whereas QGAs to the right of that player have yet to be achieved. In particular, player P3 is shown to have achieved QGA-a and QGA-b. Achievement of these QGAs may define in-game progression of player P3. Other players are shown in FIG. 5B. QGAs for game plays of those players may also be determined. For instance, player P4 has achieved only QGA-a; player P2 has achieved QGA-a and QGA-b; player 1 has achieved QGAs a-c; player 7 has achieved QGAs a-d; player 8 has achieved QGAs a-e; and player 9 has achieved QGAs a-f.

At 440, the method includes determining a social community of players at the first point in time, wherein a corresponding player in the social community of players has a corresponding QGA progression that shares one or more achieved QGAs with a first set of achieved QGAs of the first QGA progression. That is, players in the social community of players have similar in-game progression. More particularly, the social community of players is built for the benefit of the first player (e.g., player P3), and more particularly is built based on the in-game progression and/or map location of the game play of the first player—P3.

In one embodiment, similar in-game progression of QGAs is strict, such that the set of achieved QGAs is the same between game plays of different players. For example, the QGA progression of a second player includes a corresponding set of achieved QGAs that is identical to a first set of achieved QGAs of the QGA progression of the first player (e.g., player P3).

In another embodiment, similar in-game progression of QGAs is less strict, wherein QGAs may be minor in nature and/or may be linked together, such that achievement of one or more QGAs in that group by players may indicate similar in-game progressions. For example, QGAs a-e in FIG. 5B may occur at a particular stage of the gaming application, wherein players that are within that stage generally have similar game play experiences. As an illustration, the QGAs a-e may all be located at a level within a gaming application, such that achievement of those QGAs brings the corresponding player to the boss of that level. QGAs a-e may be grouped within outline 555. As such, players that are in that area of the gaming application (e.g., level) as evidenced through achievement of one or more of QGAs a-e may be interested in communicating with each other to discuss the gaming application, as they may be in a similar part of the gaming application. For example, players P1-P4 and P6-P8 may be grouped together within an emergent community that is based on the in-game progression and/or map location of player P3, as will be further described below.

At 450, the method includes for the corresponding player in the social community of players, providing a corresponding progress warning indicator showing relative progress of QGA progressions of the corresponding player and the first player. Different types of warning indicators may be used to indicate relative progress of the game play of players in an emergent social community in relation to the QGA progress of the first player (e.g., player P3). These examples are provided merely for illustration. While three indicators are shown, there may be more indicators providing additional resolution for relative progress, or less indicators providing less resolution for relative progress. For example, a red progress warning indicator shows that the corresponding game activity progression of a corresponding player is ahead of the first game activity progression of the first player (e.g., player P3). As another example, a yellow progress warning indicator shows that the corresponding game activity progression of the corresponding player is behind that of the first game activity progression of the first player (e.g., player P3). In addition, a green progress warning indicator shows that the corresponding game activity progression of the corresponding player is within an acceptable range of the first game activity progression of the first player (e.g., player P3).

At 460, the method includes generating a graphical user interface (GUI) including a list of the players in the social community of players with corresponding progress warning indicators for selection to enable communication between the first player and one or more players in the social community. In particular, the GUI is delivered to a device of the first player, wherein the GUI includes the list of players in the emergent social community, wherein each player in the list has a corresponding progress warning indicator. Upon selection of one or more players in the list by the first player through the GUI, communication is established between the first player and the selected players.

FIG. 5A illustrates a collection of QGA progressions created at various points in time, wherein the QGA progressions of one or more players in an emergent social community are shown in relation to a QGA progression of a particular player (e.g., player P3), in accordance with one embodiment of the present disclosure. FIG. 5A illustrates the dynamic nature of the emergent social community built for player P3. In particular, the emergent social community is built based on in-game progression and/or map location associated with that particular player (e.g., player P3—Warren Benedetto).

Multiple states 510 of the emergent social community built for the benefit of player P3 are shown along timeline 501. Game plays may be occurring simultaneously, or may be in a suspended state (e.g., not currently playing). For example, at time t-0, the state 510a of the emergent social community is based on the in-game progression and/or map location of player P3—Warren. In particular, the QGA progression of player P3 is shown. At this time t-0, other players having corresponding QGAs progressions that are similar to the QGA progression of player P3 are included in the emergent social community. For example, player P1 (River Hsu), player P2 (Landon Noss) and player P7 (Meredith Blake) each have similar QGAs progressions. In addition, points within sliding bar 520a have virtually identical QGA progressions as the QGA progression of player P3. That is, the game plays of all players within that sliding bar 520a are at exactly the same point in the gaming application (e.g., in-game progression, map location, etc.). As shown, player P2 (Landon) has the same QGA progression and is probably at the same point (e.g., physically or progression-wise) in the game as player P3. As such, player P2 has a progression indicator or symbol (e.g., "G") indicating the relative progress of the QGA progression of player P2 is identical to the QGA progression of player P3 (e.g., green flag indicating no warning). In that manner, both players P3 and P2 probably would not release sensitive information to each other during communications as they do not know of any sensitive information. State 510a of the emergent social community also includes player P7 (Meredith) having an "R" progression indicator or symbol that indicates that the relative progress of the QGA progression of player P7 is ahead of the QGA progression of player P3 (e.g., red flag indicating warning). As such, player P3 is warned that any communication with player P7 runs the risk of revealing sensitive information to player P3. Also, state 510a of the emergent social community also includes player P1 (River) having a "Y" progression indicator or symbol that indicates that the relative progress of the QGA progression of player P1 is behind that of the QGA progression of player P3 (e.g., yellow flag indicating warning). As such, player P3 is warned that he or she may reveal sensitive information to player P1 in any communication.

FIG. 5A shows different states of the emergent social community built for player P3 (Warren). Each of the states has no particular relation to each other, such that QGA progression is not necessarily the same for each state. More particularly, for each state QGA progressions of players are determined in relation to the QGA progression for player P3 (at a corresponding time) to determine members of the emergent social community. In particular, at each point in time, a corresponding game activity progression is determined for the game play of player P3. Also the social community of players is dynamically updated based on the game activity progression, such as achieved game activities of the corresponding game activity progression of the first player.

For example, the emergent social community in state 510b is based on the in-game progression and/or map location of player P3 (Warren) at time t-1. At this second point in time, t-1, a second game activity progression is determined for the game play of player P3, wherein time t-1 is after t-0. The emergent social community is updated based on the second game activity progression. At this time, player P3 has moved ahead of player P2 (Landon), but remains behind player P7 (Meredith). Points within sliding bar 520a have virtually identical QGA progressions as the QGA progression of player P3, wherein no other player has the same QGA progression. As shown, player P7 (Meredith) has an "R" progression indicator or symbol that indicates that the relative progress of the QGA progression of player P7 is ahead of the QGA progression of player P3 (e.g., red flag indicating warning). Also, player P1 (River) has a "Y" progression indicator or symbol that indicates that the relative progress of the QGA progression of player P1 is behind that of the QGA progression of player P3 (e.g., yellow flag indicating warning).

The emergent social community in state 510c is based on the in-game progression and/or map location of player P3 (Warren) at time t-2. At this time player P3 has moved behind both players P2 (Landon) and P7 (Meredith). Again, no players have the same QGA progression (e.g., within sliding bar 520c) as player P3. Three players have QGA progressions that are ahead of the QGA progression of player P3. For example, each of players P4, P2 (Landon) and player P7 (Meredith) have a corresponding "R" progression indicator or symbol that indicates that the relative progress of the corresponding QGA progression is ahead of the QGA progression of player P3 (e.g., red flag indicating warning—beware of spoilers!).

The emergent social community in state 510d is based on the in-game progression and/or map location of player P3 (Warren) at time t-3. At this time player P3 has moved ahead of most if not all players within the emergent community. As shown, player P7 (Meredith) has the same QGA progression and has a "G" progression indicator or symbol that indicates that the relative progress of the QGA progression of player P7 is identical to the QGA progression of player P3 (e.g., green flag indicating no warning). Also, four players have QGA progressions that are behind the QGA progression of player P3. For example, each of players P4, P1 (River), P2 (Landon), and P8 have a corresponding "Y" progression indicator or symbol that indicates that the relative progress of the corresponding QGA progression is behind that of the QGA progression of player P3 (e.g., yellow flag indicating warning—don't spoil anything for them!).

In one embodiment, player P3 can be connected to other players in the social emergent community. In particular, a list of players in the social community of players built for the benefit of player P3 is created and delivered to player P3 for selection. Players in the list may be further categorized, such as by friends, by favorites, by recently met, or by all players. Players in the list may be associated with corresponding symbols indicating progress of a corresponding game play of the corresponding player with respect to progress of the game play of player P3. Player P3 can be connected to the selected players for communication. For example, player P3 can be connected to one other player directly for one-to-one communication (e.g., over a direct channel). In addition, player P3 can be connected to multiple players over a group channel. In one embodiment, each of the group channels has a corresponding topic of discussion.

Figure 6:
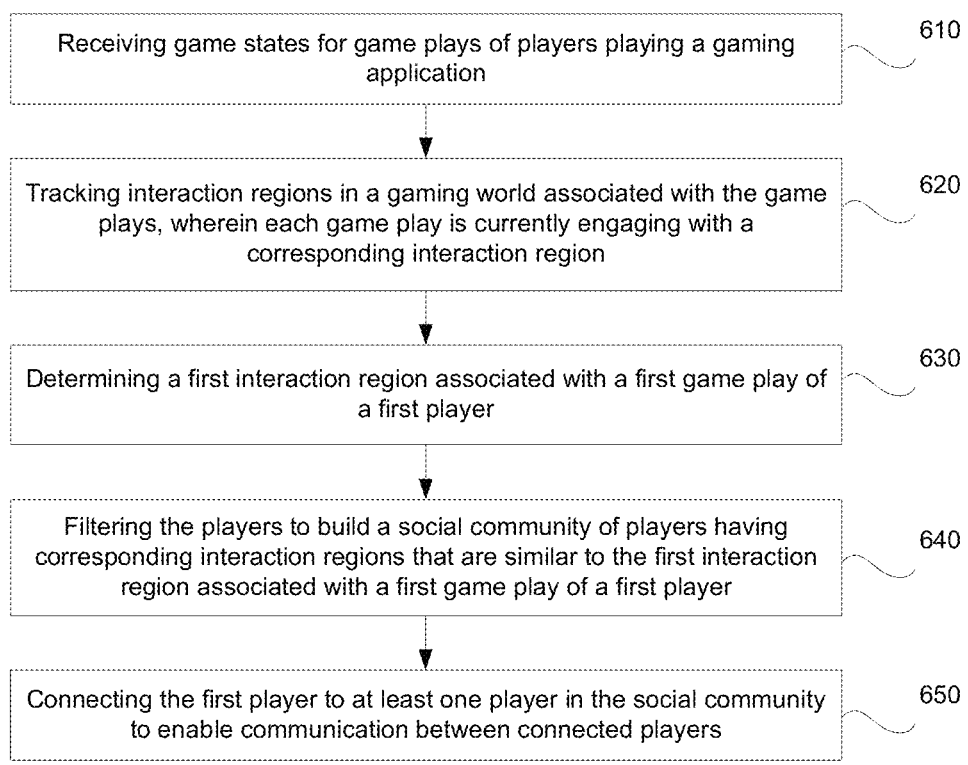
FIG. 6 is a is a flow diagram illustrating a method for gaming that connects a particular player of a gaming application to other players that are part of an emergent social community that is built based on a game play location associated with that particular player, in accordance with one embodiment of the present disclosure.

With the detailed description of the various modules of the systems 100A, 100B, and 200, flow diagram 600 discloses a method for gaming including building an emergent community for the benefit of a particular player (e.g., a first player) based on map location of the game play of that player, in accordance with one embodiment of the present disclosure. Flow diagram 600 may be implemented within a back-end server (e.g., within the game cloud system 201 in combination with the dynamic social network builder and communication engine 310), previously described. In particular, FIG. 6 is a is a flow diagram illustrating a method for gaming that connects a particular player of a gaming application to other players that are part of an emergent social community that is built based on a game play location associated with that particular player, in accordance with one embodiment of the present disclosure.

At 610, the method includes receiving a plurality of game states for a plurality of game plays of a plurality of players playing a gaming application. The gaming application may be a single-player gaming application, in one implementation. One or more of the gaming applications may be executing on a local client device including a game title executing engine and game logic, as previously described. In another implementation, one or more of the gaming applications may be executed on a remote streaming server configured to perform the functions of the game title executing engine and game logic, as previously described. Game state defines the state of a corresponding game play at that point, and game states may be collected for a corresponding game play at one or more points. Game state data allows for the generation of the gaming environment that existed at the corresponding point in the game play of the gaming application. For example, game state may include game characters, game objects, game object attributes, game attributes, game object state, graphic overlays, the state of every device used for rendering the game play, etc.

At 620, the method includes tracking a plurality of interaction regions in a gaming world associated with the plurality of game plays, wherein each game play is currently engaging with a corresponding interaction region. The game state for each game play may provide and/or be analyzed to determine a corresponding location of a corresponding game play within the gaming environment of the gaming application. For example, a character in the game play as controlled by player P3 may be within a particular interaction region (e.g., area, region, town, house, map coordinate, etc.). In one embodiment, the interaction region is a map region of a corresponding gaming environment. The map region generally encompasses a large area, and may include one or more towns, or areas (e.g., woods, open area, park, etc.). In other embodiments, the interaction region is smaller than a region, such as an area, or town, or map coordinate. In another embodiment, the interaction region is a quest. Each of the game plays has a corresponding interaction region that can be determined through corresponding game state.

At 630, the method includes determining a first interaction region in a gaming world associated with a first game play of a first player (e.g., player P3) playing the gaming application. For example, the location of a character being controlled by player P3 may determine the first interaction region. That is, the location of the character (e.g., region, area, town, map coordinate, etc.) determines the interaction region. For purposes of illustration only, the first interaction region may be a map region, such as the region of Velen in the gaming application Witcher 3, wherein the town of Blackbough is located in Velen.

At 640, the method includes filtering the plurality of players to build a social community of players based on the first interaction region of the first player (e.g., player P3). In particular, players in the social community of players have corresponding interaction regions in the gaming environment/world that are within a predefined offset from the first interaction region associated with a first game play of a first player. For example, players selected to be included in the social community may also have game plays engaged with the first interaction region, for example, a map region of Velen. That is, the first player (e.g., player P3) is engaging with the map region of Velen. In that manner, all players in the social community have game plays also engaging with the map region of Velen.

The interaction region may be more refined and/or defined. For example, the interaction region may be the town of Blackbough in the region of Velen. As such, all players in the social community have game plays engaging with the town of Blackbough, or within a distance of the town. The interaction region may be even more refined. For example, the interaction region may be a map coordinate (e.g., x, y, z coordinates). That is, the method includes determining a first map coordinate of the first game play of the first player (e.g., player P3). That is, the first map coordinate defines the first interaction region or is within the first interaction region. As such, all players in the social community have game plays engaging in the gaming environment that is near (e.g., within a predefined distance) the map coordinate of player P3. FIG. 7A illustrates players within an emergent social community that is built based on a game play location associated with that particular player (e.g., the first player P3), in accordance with one embodiment of the present disclosure. In particular, an interaction region 710 for player P3 is shown, and may be defined as a map region, or area, or town, etc., as previously described. interaction region 710 is located within a gaming environment 700 of a particular gaming application. As shown, player P3 is located in the center 713 of interaction region 710, but may be located anywhere within interaction region 710. Other players are located within interaction region and may be included within the social community that is built based on in-game progression and/or map location of player P3. For example, player P1 (River Hsu) is at point 711, player P2 (Landon Noss) is at point 712, player P4 is at point 714, player P7 (Meredith Blake) is at point 717, and player P8 is at point 718, wherein each of these players P1, P2, P4, P7 and P8 have game plays that are located within and/or are engaging within or with the interaction region 710.

In another embodiment, the interaction region may be defined by a field of view associated with the first game play of the first player (e.g., player P3). As such, all players in the social community have corresponding game plays showing corresponding field of views that are within a predefined angle offset of the field of the view of the first game play of the first player. FIG. 7B illustrates players within an emergent social community that is built based on a game play location associated with a particular player (e.g., the first player P3), and that is further filtered by a common field of view, in accordance with one embodiment of the present disclosure. In particular, player P3 has a corresponding field of view (e.g., FOV P3) taken from a particular point 713 in the gaming environment 700 of the gaming application. In addition, player P2 (Landon) has a corresponding field of view (e.g., FOV P2) taken from point 712 in the gaming environment. FOV P2 is similar to FOV P3 in that both have overlapping views into gaming environment 700. More particularly, FOV P2 is within a predefined angle of offset of FOV P3, and as such, player P2 is included within the emergent social community based on the in-game progress and/or map location of the game play of the first player (e.g., player P3).

In another embodiment, the interaction region may be defined by a depth buffer value. In particular, the interaction region may be defined by a field of view associated with the first game play of the first player (e.g., player P3). Objects are viewable within that field of view. The method may determine that a depth buffer for a second field of view associated with a second game play of a second player prevents viewing an object that is viewable in the first field of view of the first game play of the first player (e.g., player P3). In that manner, the second player is removed or not made part of the emergent social community that is built for the benefit of player P3. For example, FIG. 7B illustrates players within an emergent social community that is built based on a game play location associated with a particular player (e.g., first player P3), and that is further filtered using a depth buffer to ensure that players within a social community built for the benefit of the first player (e.g., player P3) share an unobstructed field of view, in accordance with one embodiment of the present disclosure. In particular, player P3 has a corresponding field of view (e.g., FOV P3) taken from a particular point 713 in the gaming environment 700 of the gaming application. As shown, player P3 is able to view object 730 within FOV P3. That is, the depth buffer of player P3 does not limit viewing object 730. In addition, player P2 (Landon) has a corresponding field of view (e.g., FOV' P2) taken from point 712 in the gaming environment. However, a depth buffer analysis limits the field of view of player P2 because of object 750. That is, FOV' P2 includes large object 750 (e.g., wall, rock wall, building, etc.). As such, in FOV' P2 player P2 is unable to view object 730 (e.g., along ray trace or line 720). As such, player P2 is not included in the social community that is built based on in-game progress and/or map location of the game play of the first player (e.g., player P3).

In still another embodiment, the interaction region may be less defined. For example, the interaction region may be a certain quest. In that case, the method includes determining a quest currently being played within the first game play of the first player (e.g., player P3). As such, all players in the social community have game plays engaging with the same quest. That is, players in the social community of players have corresponding game plays that are currently playing the quest (e.g., actively or in a suspended state as quests may not be critical to progress within the gaming application).

Figure 8:
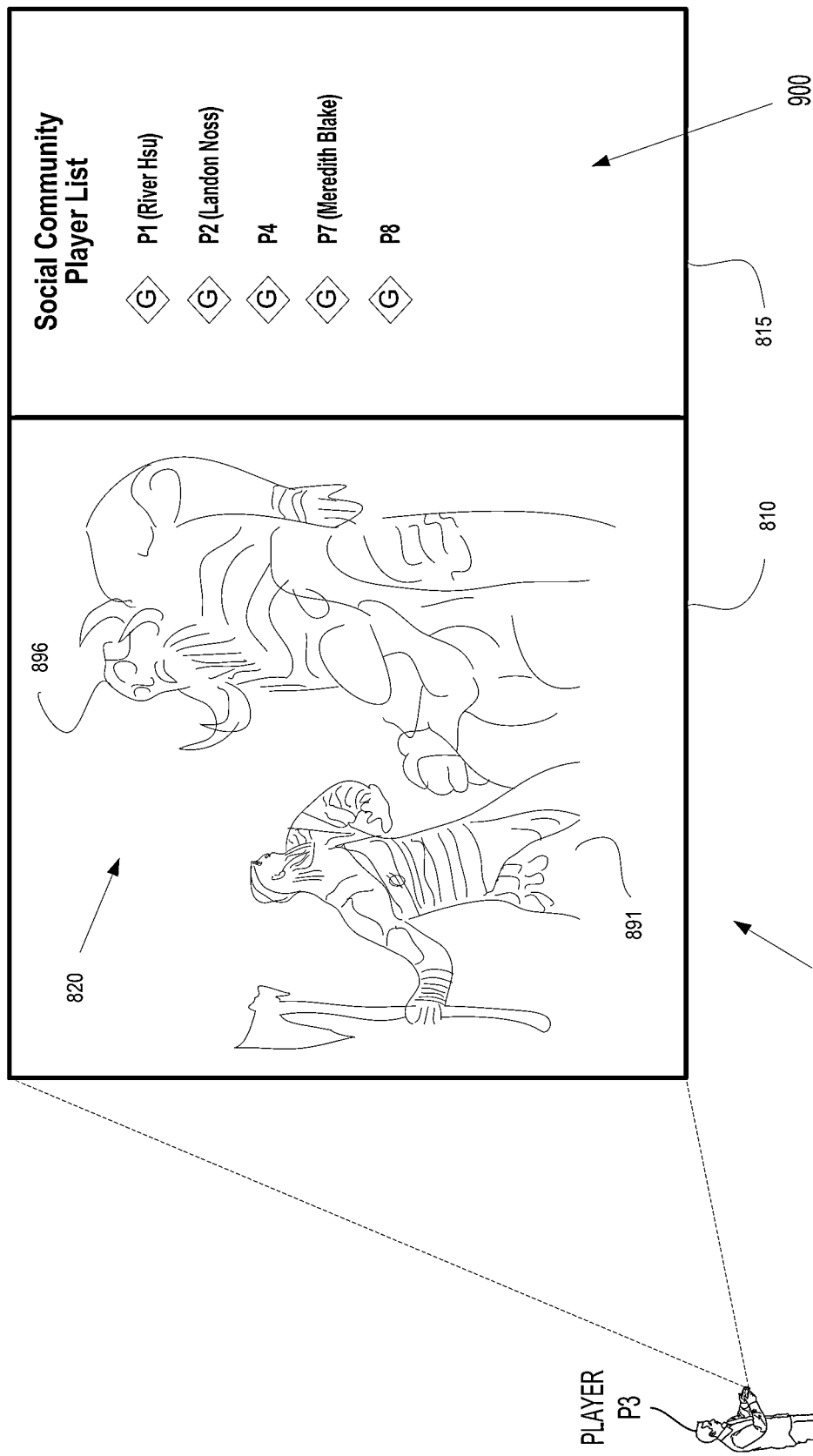
FIG. 8 illustrates a display showing game play of a particular player, and a listing of players within an emergent social community that is built based on in-game progression and/or location associated with that particular player, wherein the players within the emergent social community can communicate with each other without fear of revealing or learning of sensitive information, in accordance with one embodiment of the present disclosure.

At 650, the method includes connecting the first player (e.g., player P3) to at least one player in the social community of players to enable communication between connected players. For example, the first player may be connected directly to one other player through a direct channel. In another implementation, the first player may be connected to a group of players through a group channel In particular, a list of players in the social community of players built for the benefit of player P3 is created and delivered to player P3 for selection. For example, FIG. 8 illustrates a display 12 showing a screen shot 810 of the game play of a particular player (e.g., player P3). As shown, screen shot 810 shows a frontal view of the battle between Kratos 891 and the enemy 896. In the "God of War" gaming application, Kratos is a Spartan warrior of Greek mythology, who is tasked with killing Ares, the God of War. In the game play, a player may control Kratos 391. Display 12 also shows a GUI 900 showing a listing of players within window 815, wherein the players are included an emergent social community that is built based on in-game progression and/or location associated with the first player (e.g., player P3), as previously described. For example, players in the social community include player P1 (River Hsu), player P2 (Landon Noss), player P4, player P7 (Meredith Blake), and player P8. Players within the emergent social community can communicate with each other without fear of revealing or learning of sensitive information, as previously described.

Figure 9A:
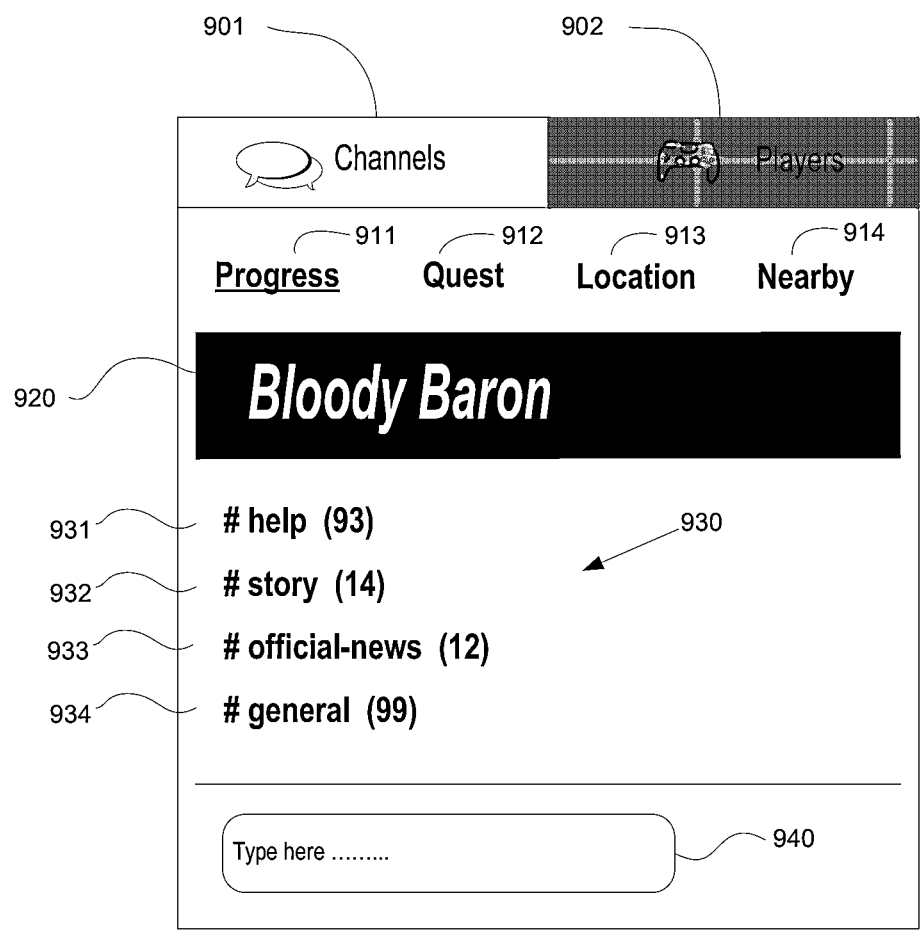
FIG. 9A illustrates a graphical user interface that provides for communication in group channels between players within an emergent social community that is built based on in-game progression and/or location associated with a particular player, in accordance with one embodiment of the present disclosure.
Figure 9B:
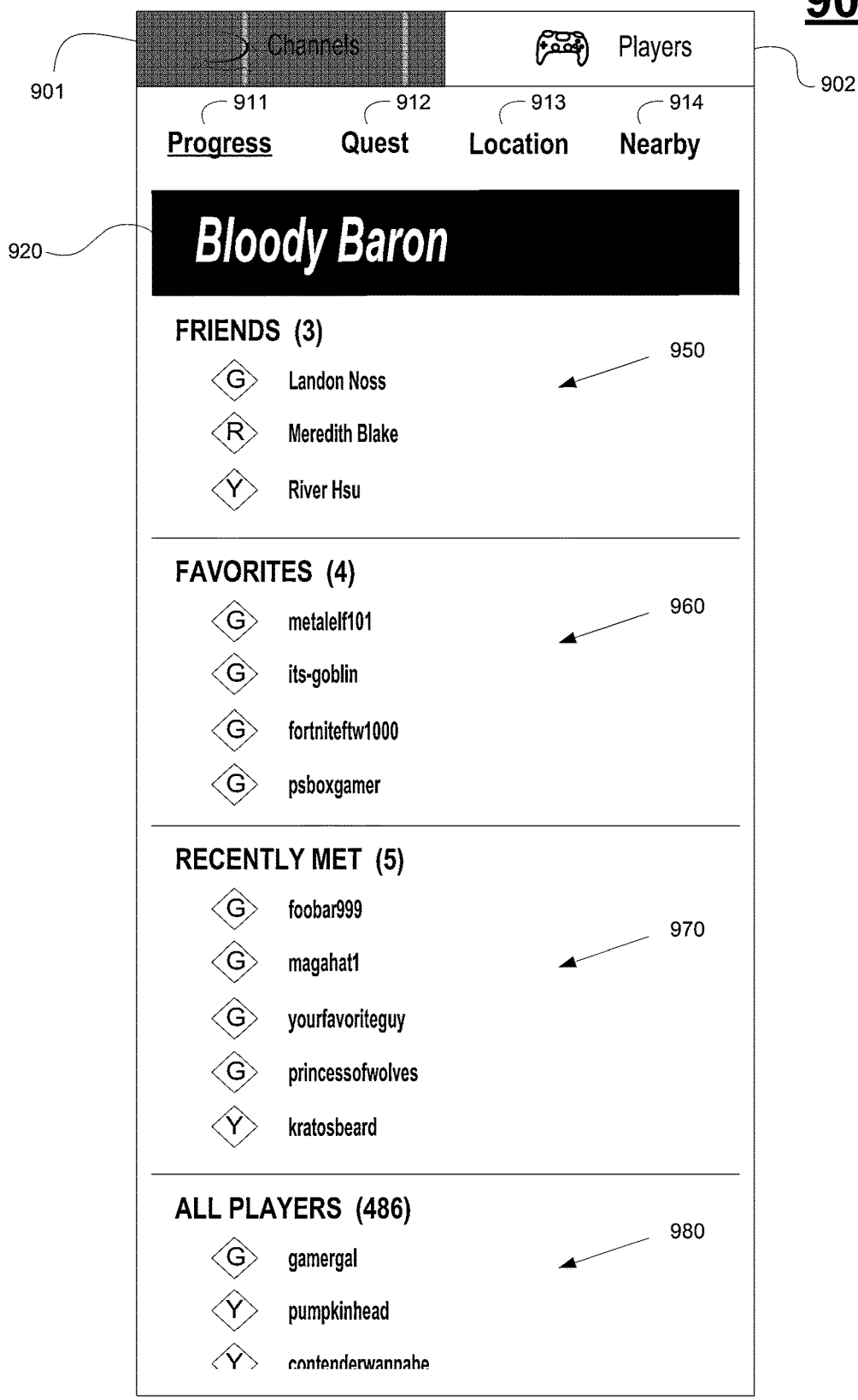
FIG. 9B illustrates a graphical user interface that provides for direct one-to-one communication between two players within an emergent social community that is built based on in-game progression and/or location associated with one of the players in the communication, in accordance with one embodiment of the present disclosure.

FIGS. 9A and 9B provide graphical user interfaces (GUIs) 900A and 900B that provide for communication between players within an emergent social community that is based on in-game progression and/or location associated with the first player (e.g., player P3), as previously described. Player P3 may be connected to a group of players or directly to a single player. For example, GUIs 900A and 900B have a channel field 901 that when selected allows player P3 to connect to multiple players through a group channel, and have a players field 902 that when selected allows player P3 to connect to a single player through a direct channel, as will be described below. In addition, the listing of group and/or direct channels may be further filtered by one or more of progress 911, quest 912, location 913, and/or nearby (e.g., proximity) 914. That is, when progress 911 is selected, the emergent social community is built based on the in-game progress of the game play of player P3. Also, when quest 912 is selected, the emergent social community is built based on the current quest in the game play of player P3. Further, when location (e.g., map location) 913 is selected, the emergent social community is built based on the map location (e.g., region, area, town, map coordinates, etc.) of the game play of player P3. Also, when nearby (e.g., proximity) 914 is selected, the emergent social community is built based on the map coordinates of the game play of player P3, and includes players having map coordinates that are within a predefined distance of the map coordinates of the game play of player P3. In both GUIs 900A and 900B, the current quest of player P3 is shown, such as the Bloody Baron quest. Field 940 allows the player P3 to enter in text for purposes of communication over a channel, for example.

In particular, FIG. 9A illustrates a graphical user interface 900A that provides for communication in group channels between players within an emergent social community that is built based on in-game progression and/or location associated with a particular player, in accordance with one embodiment of the present disclosure. As shown, field 901 is selected to provide access to one or more group channels. Each channel is configured such that everyone in that channel is in the same part of the same game as the first player (e.g., player P3), so someone in that channel has the knowledge to answer any question posed within that channel Further, because the channels are populated with players that have similar in-game contexts that corresponding to similar in-game progressions, previously described, a player posing a question need not provide a ton of context or background for the question because every player in the channel is in the same place in the gaming application. For example, the player posing the question does not have to provide information about what game is being played, what level the player is engaged with (as all players are on the same level), which Valkyrie the player is referring to in the question, etc. Even a vague question like "Where's the damn metal flower?" without any other information can get an instant, relevant answer thanks to the context-aware nature of players within the emergent social community that is built for the benefit of the first player (e.g., player P3).

Each of the group channels has a corresponding topic of discussion. Selection of a group channel joins player P3 with that channel. For example, group #story channel 932 has a topic focused on the story of the gaming application and has 14 participants. Group #general channel 934 is labeled as a general topic that allows for all types of discussion and has 99 participants.

In addition, group #help channel 931 invites receiving and giving help for game plays of the gaming application, and has 93 participants. For example, the first player P3 may be playing God of War. Player P3 is aware of and has found two of three ravens belonging to Odin in a current level of the gaming application. However, player P3 is having a difficult time finding the last raven. In that case, player P3 can pop into the #help channel 931 and ask "Hey, does anyone know where the last raven is? I found the one by the Valkyrie and by the entrance. Where's the other?" Players in that #help channel 931 may have the necessary information to find the last raven.

Further, group channel 933 has a topic that is focused on official communications from a sponsor of that channel. For example, the sponsor may be a game developer or producer of the gaming application. In that manner, the official-news channel 933 provides a unique way for game publishers and developers to connect with their customers. For example, the #official-news channel 933 allows publishers to push messages to their users based on their progression in the game, their quest, location, etc. These messages are completely context-specific, and only relevant in that context. As an illustration, Epic Games (Fortnite game publisher) might push a message to reach only Fortnite players who are currently in the region of or game platform called Tilted Towers. The official message may let customers know that a special in-game event is about to happen in that location in the next few minutes, or even the next day or upcoming week. In another illustration, Santa Monica Studios might push a message with a link to an exclusive interview with the game designer who designed the exact level the corresponding player is playing. The #official-news channel 933 provides a unique way for publishers to drive re-engagement and communicate with the players in a more personal, targeted way that doesn't feel like advertising. For example, when a player is about to finish the game (e.g., based on map location), the #official-news channel 933 may provide a link that allows the player access to downloadable content (DLC) that expands the game thereby allowing the player to continue playing the game without finishing.

FIG. 9B illustrates a graphical user interface 900B that provides for direct one-to-one communication between two players within an emergent social community that is built based on in-game progression and/or location associated with the first player (e.g., player P3) also included in the communication, in accordance with one embodiment of the present disclosure. Player P3 can be connected to the selected players (e.g., as selected by player P3 through the list describe below) for communication. For example, player P3 can be connected to one other player directly for one-to-one communication (e.g., over a direct channel).

GUI 900B provides a list of players within the emergent social community. In that manner, the first player (e.g., player P3) can connect with another player in the list. Players in the list may be further categorized, such as by friends category 950, by favorites category 960, by recently met category 970, or by all players category 980. As shown, the friends category 950 includes three friends: player P2 (Landon Noss), player P1 (River Hsu), and player P7 (Meredith Blake). The recently met category includes 5 players, and the "all players" category includes 486 players.

In addition, the favorites category 970 includes 4 players. For example, if someone in the #help channel 931 is helpful, the first player (e.g., player P3) can favorite them as someone who can be trusted for help later on. That favorite player may not have enough of a relationship to the first player (e.g., player P3) to make them a social network friend (e.g., PSN Friend), but the favoriting mechanism allows the first player to remember that favorite player for purposes of seeking help later on in the game play of the first player. In addition, the first player (e.g., player P3) may just want to directly chat within someone nice. In another embodiment, a system of "creel" or "karma" can be granted to players as a reward for being a positive member of the community.

Players in the list may be associated with corresponding symbols indicating progress of a corresponding game play of the corresponding player with respect to progress of the game play of player P3. For example, the symbol may indicate that the corresponding player has an QGA progression that is ahead of the QGA progression of the first player (e.g., red flag warning—beware of spoiler alerts), or the symbol may indicate that the corresponding player has an QGA progression that is behind that of the QGA progression of the first player (e.g., yellow flag warning—careful not to reveal spoiler alerts), or the symbol may indicate that the corresponding player has an QGA progression that is at the QGA progression of the first player (e.g., green flag indicating no spoiler alerts).

Figure 10A:
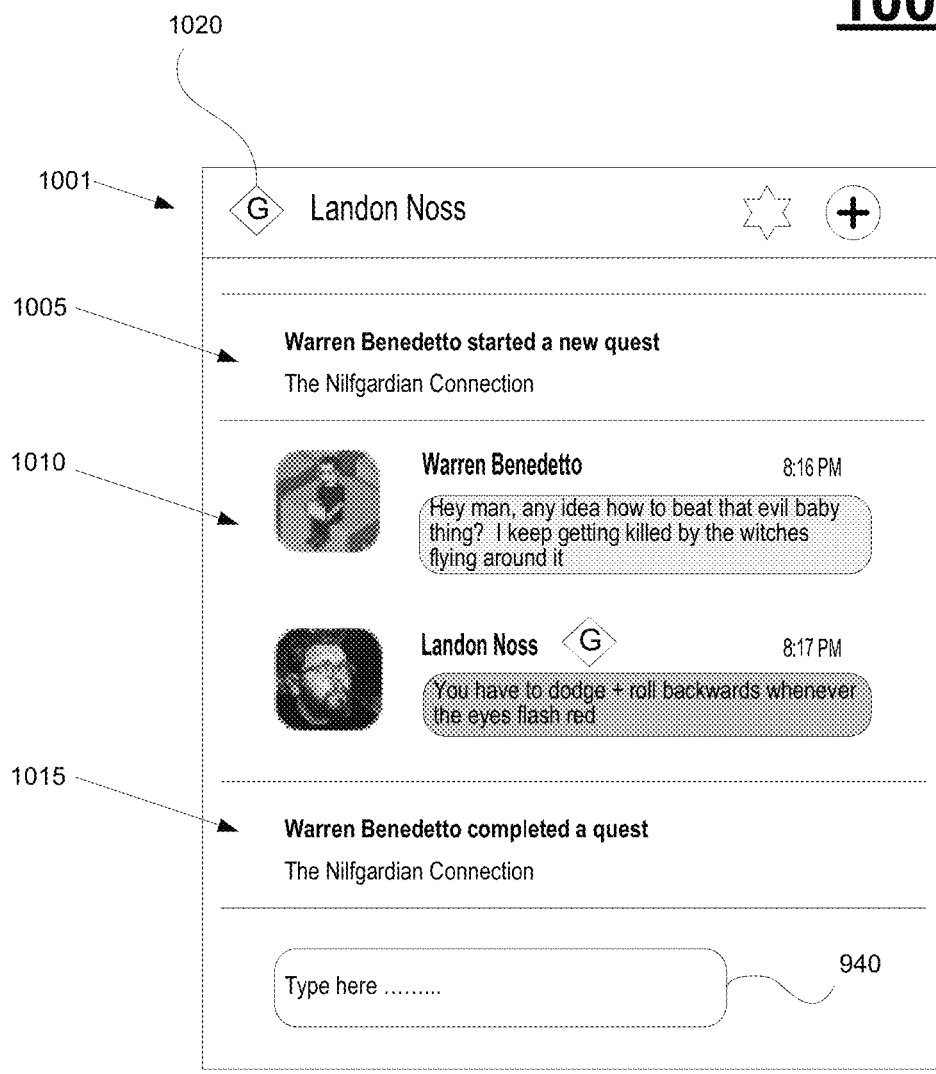
FIGS. 10A-10B illustrate a direct one-to-one communication between two players within an emergent social community that is built based on in-game progression and/or location associated with one of the players in the communication, in accordance with one embodiment of the present disclosure.
Figure 10B:
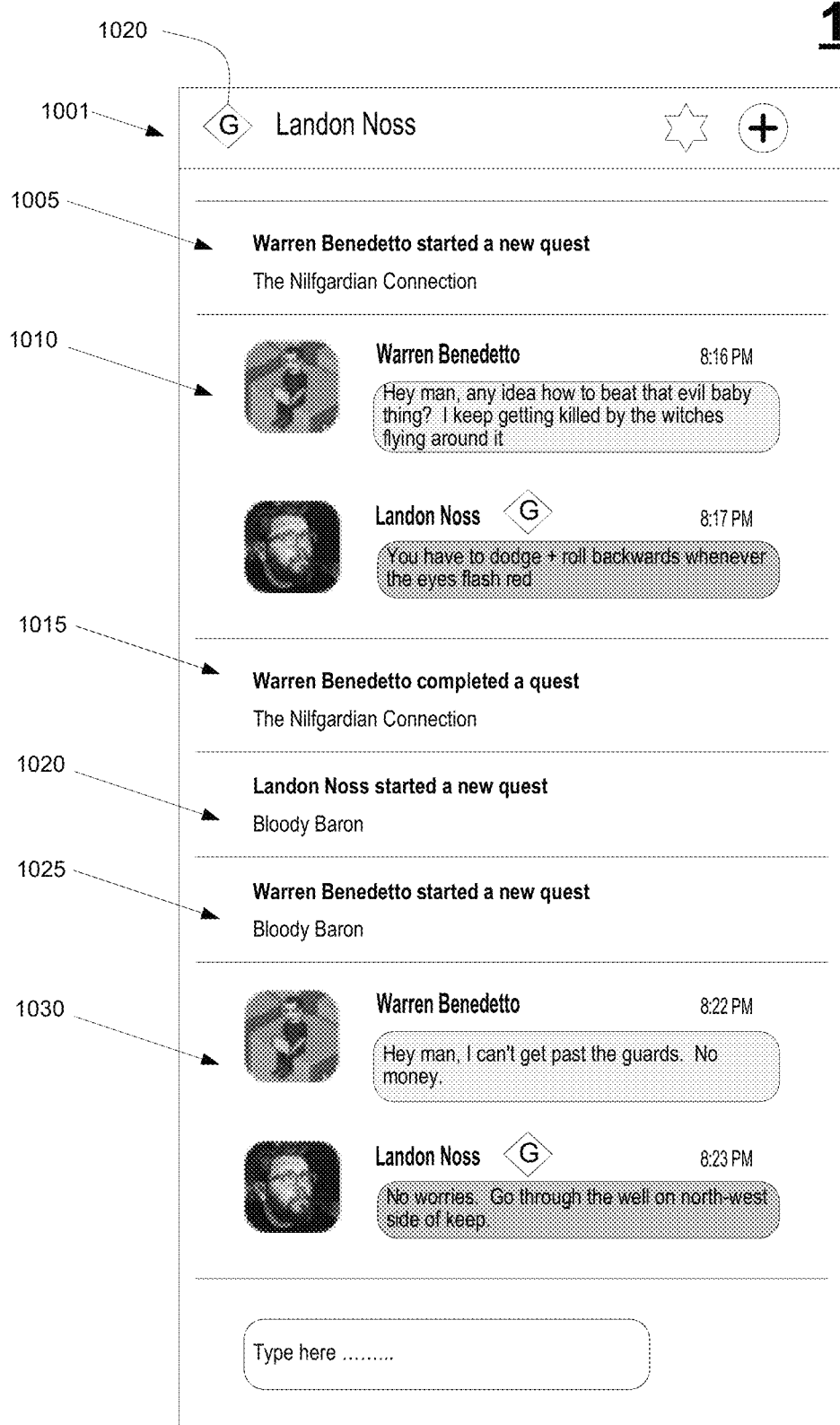

FIGS. 10A-10B illustrate a direct one-to-one communication between two players within an emergent social community that is built based on in-game progression and/or location associated with one of the players (e.g., the first player—player P3, Warren) in the communication, in accordance with one embodiment of the present disclosure. For example, player P3 is communicating with player P2 (Landon Noss) over a direct channel, as is shown in title bar 1001.

Further, player P2 has a progress indicator 1020 that indicates that the relative QGA progression of player P2 is the same as the QGA progression of player P3, and as such, there probably is minimal risk that sensitive information will be revealed in any communication between these players. As shown in information section 1005, player P3 (Warren) has started in a new quest—"The Nilfgardian Connection". Because player 2 (Landon) is included in the emergent social community built for player P3, and has a QGA progress indicator showing safe communications, player 2 is probably also currently on the same quest. That is, player 2 (Landon) may be included in a list showing players in the corresponding emergent social community (e.g., that shown in GUI 900B). Even though player P3 (Warren) is friends with player P2 (Landon), player P3 may initially be reluctant to reach out to ask for help, because player P3 (Warren) may not know whether player P2 (Landon) is able to answer the posed question about the corresponding level (e.g., quest) in the gaming application. Player P3 (Warren) may not even contact player P2 (Landon) for fear that he or she may reveal sensitive information and spoil the game for player P2. However, because player P2 (Landon) is included in the social community built for player P3, both players are probably in the same battle, and as such, player 2 (Landon) may be able to help player P3, and player P3 can communicate with player P2 (Landon) without giving too much setup or context, or fear of revealing sensitive information. For example, player P3 (Warren) may send a direct message to friend and player P2 (Landon) asking for advice on how to beat the "evil baby thing", as shown in message section 1010. Player 2 (Landon) probably knows about the "evil baby thing" because both players P3 and P2 are in the same part of the gaming application. If player P2 (Landon) is unable to help, at least both players can communicate and support each other with strategies as we figure out how to beat the "evil baby thing". It turns out that player P2 (Landon) can help, and provides information on how to beat the "evil baby thing" in message section 1010 (e.g., dodge and roll).

In information section 1015, information is given that player P3 (Warren) has completed the quest—"The Nilfgardian Connection". In that manner, player P2 (Landon) possibly may now be removed from the social community built for the benefit of player P3, because both players are on different quests. Because the emergent social community is dynamically built and updated, player 2 (Landon) may again be included in the social community. For example, in FIG. 10B, the direct communication between player P3 (Warren) and player P2 (Landon) may be continued because both players are beginning a new quest—"The Bloody Baron". For instance, in message section 1020 information is given that shows that player P2 (Landon) has started a new quest—Bloody Baron. In addition in message section 1025, information is given that shows that player P3 (Warren) has also started the same quest. As such the direct communication can be continued without fear that sensitive information may be revealed to either player. For example, in message section 1030, player P3 (Warren) again directly asks player P2 (Landon) for help in getting past the guards. Player P2 has figured out how to get past the guards, and provides a tip (e.g., go to the well) in a response provided in message section 1030.

In another embodiment, player P3 (Warren) may have another player show how to achieve a task. For example, player P3 is having a hard time finding a collectible in the gaming application. Both players P3 (Warren) and P2 (Landon) are in the same map location, based on the members of the social emergent community built for the benefit of player P3. As such, player P3 (Warren) and player P2 (Landon) can engage in a direct one-to-one communication. Instead of player P2 (Landon) trying to explain to player P3 (Warren) where the collectible is via landmarks or other description, player P2 can show player P3 (Warren) how to physically go to the collectible's location in my own copy of the game. For example, this may be done through a split screen for player P3 (Warren) that has a window showing the game play of player P2 (Landon). Player P2 (Landon) can also narrate instructions by telling player P3 (Warren) when he or she is nearby (e.g., based on proximity or map location). Relative location may also be given (e.g., cardinal direction). In that manner, both players P2 (Landon) and P3 (Warren) know when they are in the exact same x/y/z location. As such, player P2 is able to show and/or direct player P3 (Warren) to find the collectible.

In another embodiment, because game states are collected for players in the emergent community built for the benefit of a player (e.g., player P3), information can be readily shared between players of the emergent community. For example, player P3 (Warren) is able to share a corresponding load-out of a character (e.g., controlled by player P3 during game play) with player P2 (Landon) in real-time. That way, player P2 (Landon) is able to see how player P3 (Warren) has equipped a corresponding character (e.g., controlled by player P3). In another embodiment, player P2 (Landon) can activate a button or icon that enables a corresponding instance of the gaming application (e.g., supporting player P2) to mirror the load-out used in the game play of player P3 (Warren). This assumes that player P2 has access to the weapons and skill used in that load-out. Similarly, player P3 (Warren) can view player P2's (Landon) load-out, and make suggestions (e.g., through direct communications) about how to better equip a corresponding character (e.g., controlled by player P2) for a particular battle. Further, the viewing player (P3—Warren) can see dynamic updates to the inventory and load-out in real time as player P2 (Landon) experiments with different configurations.

Figure 11:
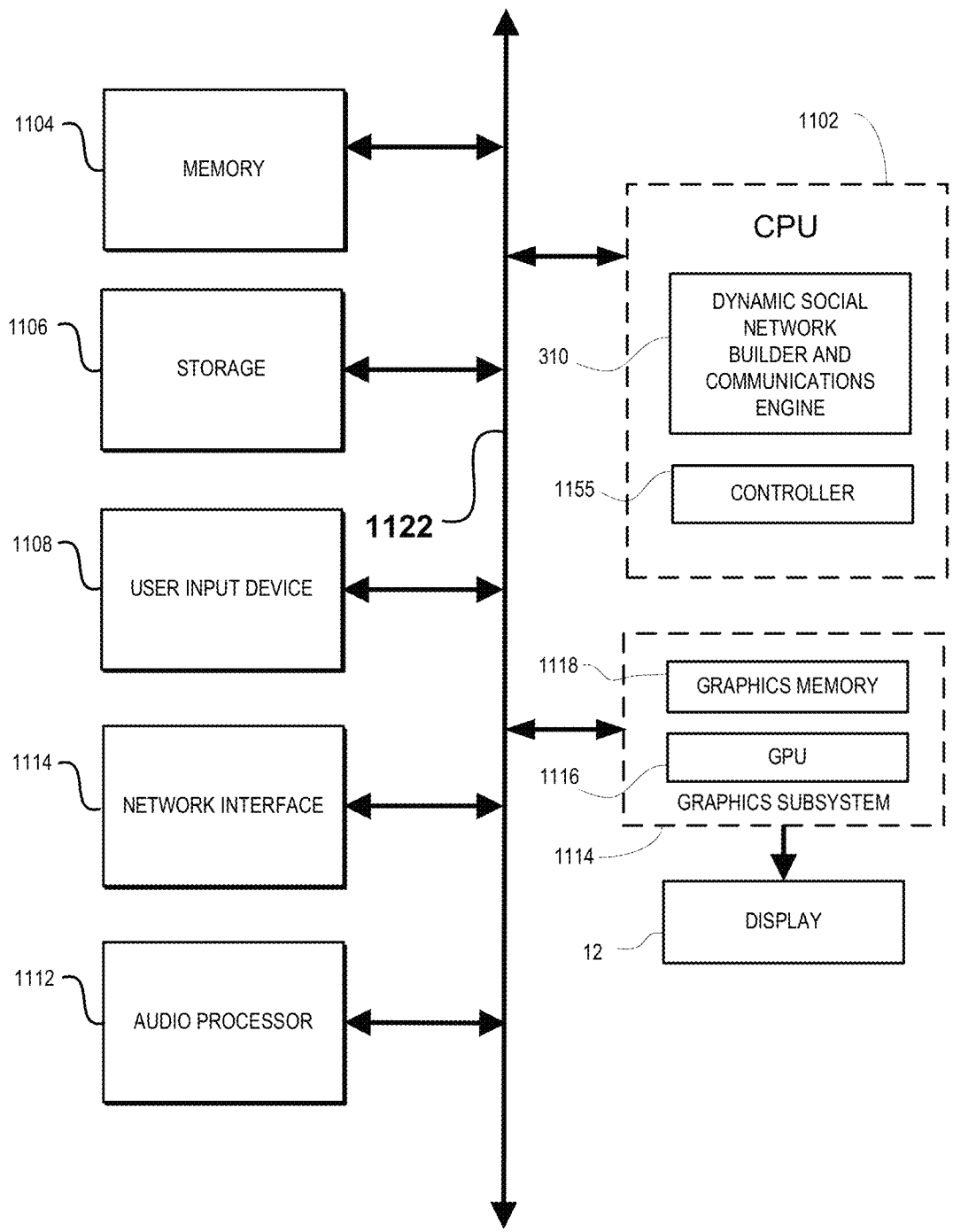
FIG. 11 illustrates components of an example device that can be used to perform aspects of the various embodiments of the present disclosure.

FIG. 11 illustrates components of an example device 1100 that can be used to perform aspects of the various embodiments of the present disclosure. For example, FIG. 11 illustrates an exemplary hardware system suitable for building instant social connections and emergent communities based on in-game progression and/or a location of a particular player playing a gaming application, in accordance with one embodiment of the present disclosure. This block diagram illustrates a device 1100 that can incorporate or can be a personal computer, a server computer, gaming console, mobile device, or other digital device, each of which is suitable for practicing an embodiment of the invention. Device 1100 includes a central processing unit (CPU) 1102 for running software applications and optionally an operating system. CPU 1102 may be comprised of one or more homogeneous or heterogeneous processing cores.

In accordance with various embodiments, CPU 1102 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 1102 may be configured to include the dynamic social network builder and communication engine 310 that is configured to build instant social connections and emergent communities based on in-game progression and/or location (e.g., map location) of a particular player playing a gaming application. In that manner, players in the emergent community may be connected with each other through direct one-to-one or player-to-player channels or through group channels supporting multiple players. Players in these channels know approximately the same amount of information as each of them has progressed similarly through the gaming application, and/or are currently in the same map location of a corresponding gaming world of the gaming application. In addition, each of the players has intimate knowledge of a game context that is associated with the shared in-game progression and/or map location. In that manner, the players within the communication channels do not have to be hyper vigilant when communicating for fear of revealing sensitive information about the gaming application.

Memory 1104 stores applications and data for use by the CPU 1102. Storage 1106 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1108 communicate user inputs from one or more users to device 1100, examples of which may include keyboards, mice, joysticks, touch pads, touch screens, still or video recorders/cameras, and/or microphones. Network interface 1114 allows device 1100 to communicate with other computer systems via an electronic communications network, and may include wired or wireless communication over local area networks and wide area networks such as the internet. An audio processor 1112 is adapted to generate analog or digital audio output from instructions and/or data provided by the CPU 1102, memory 1104, and/or storage 1106. The components of device 1100, including CPU 1102, memory 1104, data storage 1106, user input devices 1108, network interface 1110, and audio processor 1112 are connected via one or more data buses 1122.

A graphics subsystem 1114 is further connected with data bus 1122 and the components of the device 1100. The graphics subsystem 1114 includes a graphics processing unit (GPU) 1116 and graphics memory 1118. Graphics memory 1118 includes a display memory (e.g., a frame buffer) used for storing pixel data for each pixel of an output image. Graphics memory 1118 can be integrated in the same device as GPU 1116, connected as a separate device with GPU 1116, and/or implemented within memory 1104. Pixel data can be provided to graphics memory 1118 directly from the CPU 1102. Alternatively, CPU 1102 provides the GPU 1116 with data and/or instructions defining the desired output images, from which the GPU 1116 generates the pixel data of one or more output images. The data and/or instructions defining the desired output images can be stored in memory 1104 and/or graphics memory 1118. In an embodiment, the GPU 1116 includes 3D rendering capabilities for generating pixel data for output images from instructions and data defining the geometry, lighting, shading, texturing, motion, and/or camera parameters for a scene. The GPU 1116 can further include one or more programmable execution units capable of executing shader programs.

The graphics subsystem 1114 periodically outputs pixel data for an image from graphics memory 1118 to be displayed on display device 12, or to be projected by projection system 1140. Display device 12 can be any device capable of displaying visual information in response to a signal from the device 1100, including CRT, LCD, plasma, and OLED displays. Device 1100 can provide the display device 12 with an analog or digital signal, for example.

Accordingly, the present disclosure described systems and methods for building instant social connections and emergent communities based on in-game progression and location of a particular player playing a gaming application. In that manner, that player can be connected to other players in the community via a direct channel to one other player or a group channel connecting multiple players for purposes of socially communicating about the gaming application. Because all the players in the emergent community have about the same knowledge of the gaming application, there is limited risk in revealing sensitive information when communicating.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. A method for gaming, comprising:
receiving at a game server a plurality of game states for a plurality of game plays of a plurality of players playing a single-player gaming application, wherein the plurality of game plays are played in isolation;
tracking at the game server, using the plurality of game states, a plurality of interaction regions in a gaming world associated with the plurality of game plays, wherein each game play is currently engaging with a corresponding interaction region;
determining at the game server, using the plurality of game states, a first interaction region in a gaming world associated with a first game play of a first player playing the single-player gaming application;
filtering at the game server the plurality of players to build a social community of players, wherein players in the social community of players have corresponding interaction regions in the gaming world that are within a predefined offset from the first interaction region associated with a first game play of a first player, wherein the filtering the plurality of players to build the social community of players includes:
  determining at the game server a first field of view associated with the first game play of the first player based on the plurality of game states; and
  determining that the social community of players have corresponding game plays showing corresponding field of views that are within a predefined angle offset of the first field of view based on the plurality of game states; and
dynamically creating an online forum by connecting over at least one communication channel in a communication network a device of the first player to one or more devices of at least one player in the social community of players to enable communication between connected players,
wherein the online forum is created during the first game play of the first player.

2. The method of claim 1, wherein the filtering the plurality of players to build a social community of players includes:
  determining a quest currently being played within the first game play of the first player,
  wherein the players in the social community of players have corresponding game plays that are currently playing the quest.

3. The method of claim 1, wherein the filtering the plurality of players to build a social community of players includes:
  determining a first map region as the first interaction region associated with the first game play of the first player,
  wherein the players in the social community of players have corresponding game plays currently engaging with the first map region.

4. The method of claim 1, further comprising:
  determining that a depth buffer for a second field of view associated with a second game play of a second player prevents viewing an object viewable in the first field of view; and
  removing the second player from the social community of players.

5. The method of claim 1, wherein the filtering the plurality of players to build a social community of players includes:
  determining a first map coordinate of the first game play of the first player, the first map coordinate being within the first interaction region,
  wherein the players in the social community of players have corresponding map coordinates associated with corresponding game plays that are within a predefined distance of the first map coordinate.

6. A non-transitory computer-readable medium storing a computer program for gaming, the computer-readable medium comprising:
  program instructions for receiving at a game server a plurality of game states for a plurality of game plays of a plurality of players playing a single-player gaming application, wherein the plurality of game plays are played in isolation;
  program instructions for tracking at the game server, using the plurality of game states, a plurality of interaction regions in a gaming world associated with the plurality of game plays, wherein each game play is currently engaging with a corresponding interaction region;
  program instructions for determining, using the plurality of game states, a first interaction region in a gaming world associated with a first game play of a first player playing the single-player gaming application;
  program instructions for filtering at the game server the plurality of players to build a social community of players, wherein players in the social community of players have corresponding interaction regions in the gaming world that are within a predefined offset from the first interaction region associated with a first game play of a first player, wherein the program instructions for filtering the plurality of players to build the social community of players includes:
    program instructions for determining a first field of view associated with the first game play of the first player based on the plurality of game states; and
    determining that the players in the social community of players have corresponding game plays showing corresponding field of views that are within a predefined angle offset of the first field of view based on the plurality of game states; and
  program instructions for dynamically creating an online forum by connecting over at least one communication channel in a communication network a device of the first player to one or more devices of at least one player in the social community of players to enable communication between connected players,
  wherein the online forum is created during the first game play of the first player.

7. The non-transitory computer-readable medium of claim 6, wherein the program instructions for filtering the plurality of players to build a social community of players includes:
  program instructions for determining a quest currently being played within the first game play of the first player,
  wherein the players in the social community of players have corresponding game plays that are currently playing the quest.

8. The non-transitory computer-readable medium of claim 6, wherein the program instructions for filtering the plurality of players to build a social community of players includes:
  program instructions for determining a first map region as the first interaction region associated with the first game play of the first player,
  wherein the players in the social community of players have corresponding game plays currently engaging with the first map region.

9. The non-transitory computer-readable medium of claim 6, further comprising:
  program instructions for determining that a depth buffer for a second field of view associated with a second game play of a second player prevents viewing an object viewable in the first field of view; and
  program instructions for removing the second player from the social community of players.

10. The non-transitory computer-readable medium of claim 6, wherein the program instructions for filtering the plurality of players to build a social community of players includes:
  program instructions for determining a first map coordinate of the first game play of the first player, the first map coordinate being within the first interaction region,
  wherein the players in the social community of players have corresponding map coordinates associated with corresponding game plays that are within a predefined distance of the first map coordinate.

11. A computer system comprising:

a processor;

memory coupled to the processor and having stored therein instructions that, if executed by the computer system, cause the computer system to execute a method for gaming, comprising:

receiving at a game server a plurality of game states for a plurality of game plays of a plurality of players playing a single-player gaming application, wherein the plurality of game plays are played in isolation;

tracking at the game server, using the plurality of game states, a plurality of interaction regions in a gaming world associated with the plurality of game plays, wherein each game play is currently engaging with a corresponding interaction region;

determining at the game server, using the plurality of game states, a first interaction region in a gaming world associated with a first game play of a first player playing the single-player gaming application;

filtering at the game server the plurality of players to build a social community of players, wherein players in the social community of players have corresponding interaction regions in the gaming world that are within a predefined offset from the first interaction region associated with a first game play of a first player, wherein the filtering the plurality of players to build the social community of players includes:

determining a first field of view associated with the first game play of the first player based on the plurality of game states; and determining that the players in the social community of players have corresponding game plays showing corresponding field of views that are within a predefined angle offset of the first field of view based on the plurality of game states; and dynamically creating an online forum by connecting over at least one communication channel in a communication network a device of the first player to one or more devices of at least one player in the social community of players to enable communication between connected players, wherein the online forum is created during the first game play of the first player.

12. The computer system of claim 11, wherein in the method the filtering the plurality of players to build a social community of players includes:

determining a quest currently being played within the first game play of the first player, wherein the players in the social community of players have corresponding game plays that are currently playing the quest.

13. The computer system of claim 11, wherein in the method the filtering the plurality of players to build a social community of players includes:

determining a first map region as the first interaction region associated with the first game play of the first player, wherein the players in the social community of players have corresponding game plays currently engaging with the first map region.

14. The computer system of claim 11, the method further comprising:

determining that a depth buffer for a second field of view associated with a second game play of a second player prevents viewing an object viewable in the first field of view; and removing the second player from the social community of players.

15. The computer system of claim 11, wherein in the method the filtering the plurality of players to build a social community of players includes:

determining a first map coordinate of the first game play of the first player, the first map coordinate being within the first interaction region, wherein the players in the social community of players have corresponding map coordinates associated with corresponding game plays that are within a predefined distance of the first map coordinate.

* * * * *